US012573149B2

(12) United States Patent
Lin

(10) Patent No.: US 12,573,149 B2
(45) Date of Patent: Mar. 10, 2026

(54) DATA PROCESSING METHOD AND APPARATUS, DEVICE, COMPUTER-READABLE STORAGE MEDIUM, AND COMPUTER PROGRAM PRODUCT

(71) Applicant: TENCENT TECHNOLOGY (SHENZHEN) COMPANY LTD, Guangdong (CN)

(72) Inventor: Koon Wing Macgyver Lin, Guangdong (CN)

(73) Assignee: TENCENT TECHNOLOGY (SHENZHEN) COMPANY LTD, Shenzhen (CN)

( * ) Notice: Subject to any disclaimer, the term of this patent is extended or adjusted under 35 U.S.C. 154(b) by 242 days.

(21) Appl. No.: 18/324,617

(22) Filed: May 26, 2023

(65) Prior Publication Data

US 2023/0351696 A1 Nov. 2, 2023

Related U.S. Application Data

(63) Continuation of application No. PCT/CN2022/128311, filed on Oct. 28, 2022.

(30) Foreign Application Priority Data

Jan. 17, 2022 (CN) .......................... 202210050745.3

(51) Int. Cl.
G06T 17/20 (2006.01)
G06T 7/13 (2017.01)
(Continued)

(52) U.S. Cl.
CPC ................ G06T 17/20 (2013.01); G06T 7/13 (2017.01); G06T 7/75 (2017.01); G06T 15/00 (2013.01); *G06T 2200/04* (2013.01)

(58) Field of Classification Search
CPC .. G06T 17/20; G06T 7/13; G06T 7/75; G06T 15/00; G06T 2200/04; G06T 17/005; G06T 17/205; G06T 15/205
See application file for complete search history.

(56) References Cited

U.S. PATENT DOCUMENTS

2003/0067461 A1* 4/2003 Fletcher .................. G06T 17/20
345/420
2005/0116949 A1* 6/2005 Hoppe .................... G06T 17/20
345/423

(Continued)

FOREIGN PATENT DOCUMENTS

CN 101872488 A 10/2010
CN 109461205 A 3/2019
CN 112700517 A 4/2021

OTHER PUBLICATIONS

Smelik, Ruben, et al. "Dynamic synthetic environments: a survey." The Journal of Defense Modeling and Simulation 16.3 (2019): 255-271. (Year: 2019).*

(Continued)

*Primary Examiner* — Kent W Chang
*Assistant Examiner* — Karl Duc Truong
(74) *Attorney, Agent, or Firm* — Sughrue Mion, PLLC

(57) ABSTRACT

A data processing method includes acquiring three-dimensional mesh data to be processed, and performing dimension reduction on the three-dimensional mesh data to obtain two-dimensional mesh data, the two-dimensional mesh data including vertex information and triangle information, constructing a hierarchical sub-mesh structure, each level of the hierarchical sub-mesh structure including one or more sub-meshes, performing grouping of triangles on the two-dimensional mesh data to obtain triangle grouping sets corresponding to the sub-meshes, hierarchically storing the sub-meshes and the triangle grouping sets corresponding to the sub- (Continued)

meshes, and determining cross-section loops of the sub-meshes, and rendering, based on the cross-section loops, cross-sections of each of the sub-meshes.

17 Claims, 17 Drawing Sheets

(51) Int. Cl.
*G06T 7/73*      (2017.01)
*G06T 15/00*     (2011.01)

(56)              References Cited

U.S. PATENT DOCUMENTS

| 2006/0176300 | A1* | 8/2006 | Loop | G06T 17/20 |
| | | | | 345/421 |
| 2007/0002043 | A1* | 1/2007 | Guenter | G06T 17/10 |
| | | | | 345/420 |
| 2010/0045670 | A1* | 2/2010 | O'Brien | G06T 15/04 |
| | | | | 345/420 |
| 2010/0271369 | A1* | 10/2010 | Chang | G06T 17/20 |
| | | | | 345/423 |
| 2012/0249557 | A1 | 10/2012 | Ferguson et al. | |
| 2012/0313927 | A1* | 12/2012 | Curington | G06T 9/001 |
| | | | | 345/419 |
| 2017/0061036 | A1* | 3/2017 | Schmidt | G06F 30/20 |
| 2017/0091992 | A1* | 3/2017 | Rogers | G06T 17/20 |
| 2017/0148182 | A1* | 5/2017 | Yoshida | G06T 19/00 |
| 2020/0342656 | A1* | 10/2020 | Cichocki | G06T 15/20 |
| 2023/0162445 | A1* | 5/2023 | Mason | G06T 17/205 |
| | | | | 345/419 |

OTHER PUBLICATIONS

International Search Report for PCT/CN2022/128311 dated Jan. 19, 2023.
Written Opinion for PCT/CN2022/128311 dated Jan. 19, 2023.

* cited by examiner

Face = [0, 1, 2]

0

Edge = [0, 1]    Edge = [2, 0]

1    Vertex = [x, y, z]

Edge 1 = [1, 2]    2

100

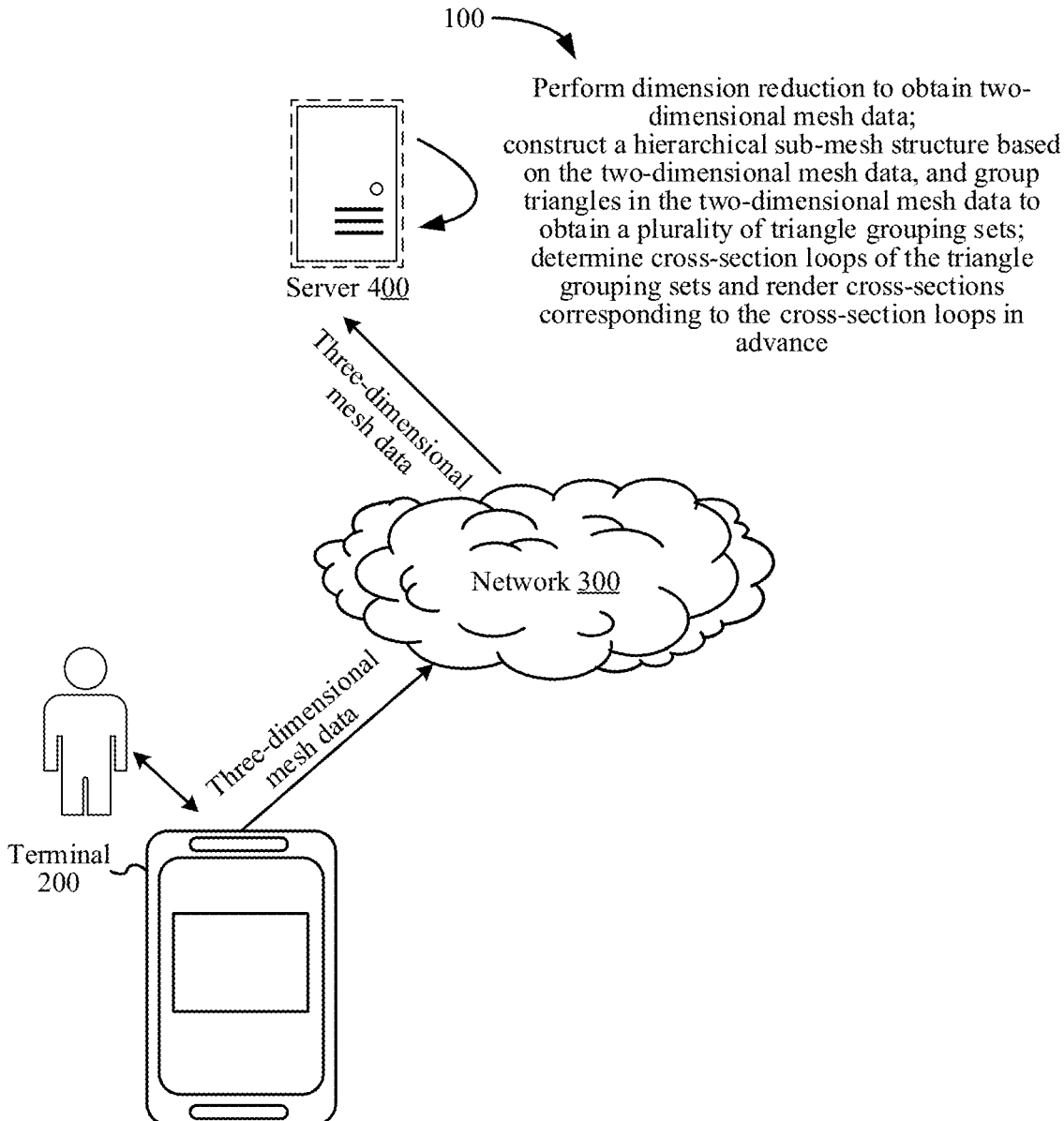

Perform dimension reduction to obtain two-dimensional mesh data;
construct a hierarchical sub-mesh structure based on the two-dimensional mesh data, and group triangles in the two-dimensional mesh data to obtain a plurality of triangle grouping sets; determine cross-section loops of the triangle grouping sets and render cross-sections corresponding to the cross-section loops in advance Server 400

Three-dimensional mesh data

Network 300

Terminal 200

Three-dimensional mesh data

FIG. 2

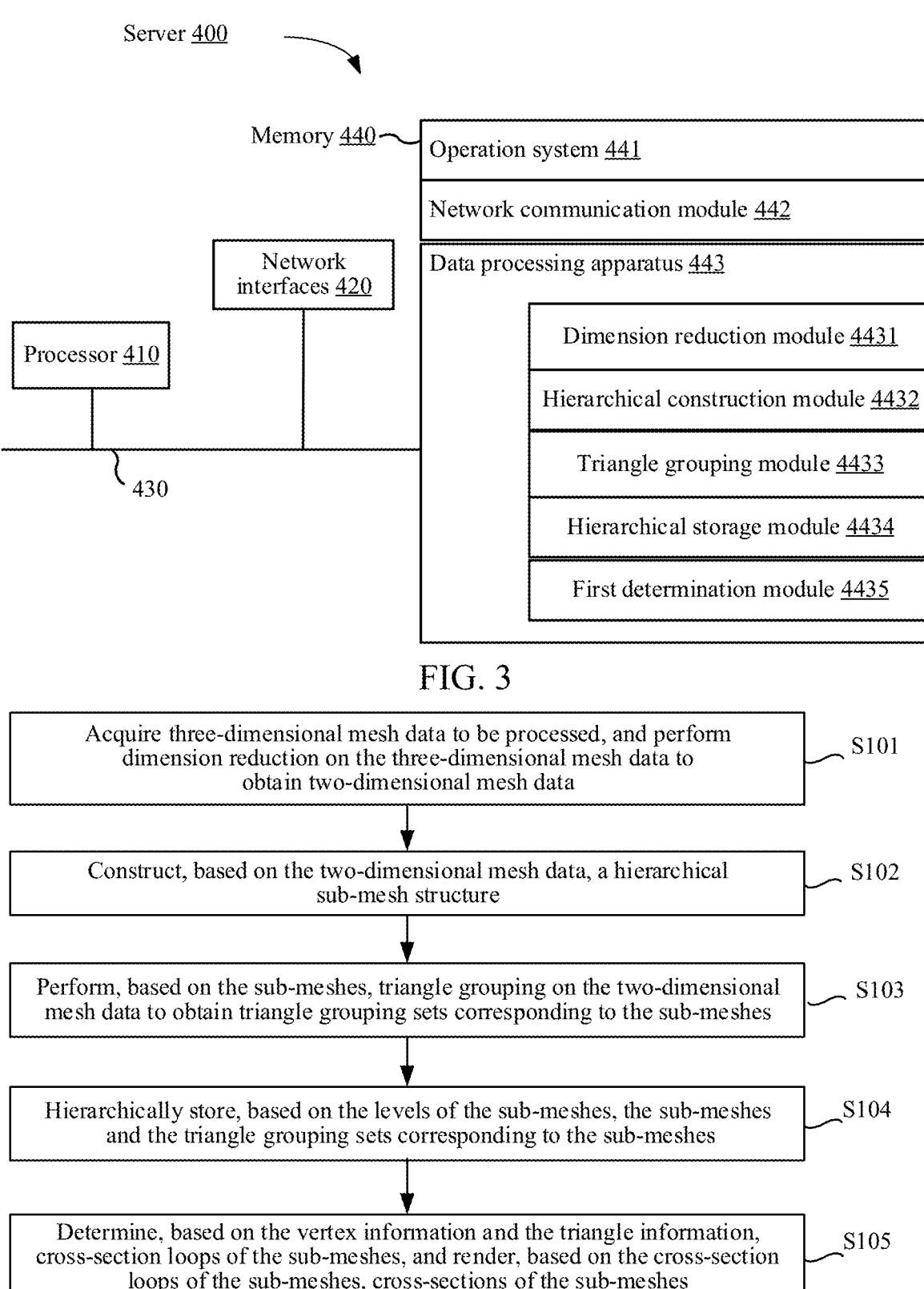

Server <u>400</u>

Memory <u>440</u>

Operation system <u>441</u>

Network communication module <u>442</u>

Network interfaces <u>420</u>

Data processing apparatus <u>443</u>

Dimension reduction module <u>4431</u>

Hierarchical construction module <u>4432</u>

Processor <u>410</u>

Triangle grouping module <u>4433</u>

Hierarchical storage module <u>4434</u>

430

First determination module <u>4435</u>

FIG. 3

Acquire three-dimensional mesh data to be processed, and perform dimension reduction on the three-dimensional mesh data to obtain two-dimensional mesh data — S101

Construct, based on the two-dimensional mesh data, a hierarchical sub-mesh structure — S102

Perform, based on the sub-meshes, triangle grouping on the two-dimensional mesh data to obtain triangle grouping sets corresponding to the sub-meshes — S103

Hierarchically store, based on the levels of the sub-meshes, the sub-meshes and the triangle grouping sets corresponding to the sub-meshes — S104

Determine, based on the vertex information and the triangle information, cross-section loops of the sub-meshes, and render, based on the cross-section loops of the sub-meshes, cross-sections of the sub-meshes — S105

FIG. 4

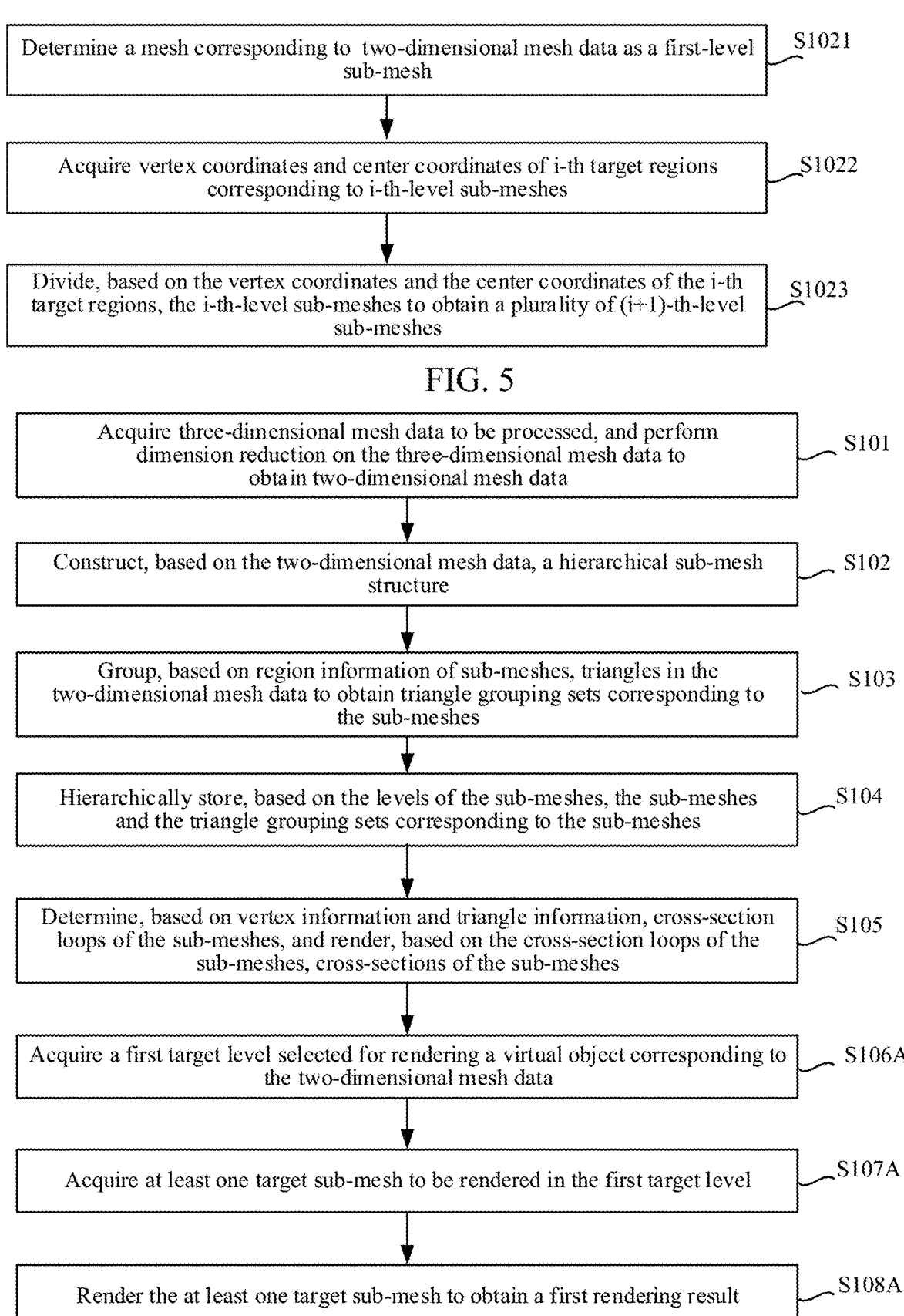

Determine a mesh corresponding to two-dimensional mesh data as a first-level sub-mesh — S1021

Acquire vertex coordinates and center coordinates of i-th target regions corresponding to i-th-level sub-meshes — S1022

Divide, based on the vertex coordinates and the center coordinates of the i-th target regions, the i-th-level sub-meshes to obtain a plurality of (i+1)-th-level sub-meshes — S1023

FIG. 5

Acquire three-dimensional mesh data to be processed, and perform dimension reduction on the three-dimensional mesh data to obtain two-dimensional mesh data — S101

Construct, based on the two-dimensional mesh data, a hierarchical sub-mesh structure — S102

Group, based on region information of sub-meshes, triangles in the two-dimensional mesh data to obtain triangle grouping sets corresponding to the sub-meshes — S103

Hierarchically store, based on the levels of the sub-meshes, the sub-meshes and the triangle grouping sets corresponding to the sub-meshes — S104

Determine, based on vertex information and triangle information, cross-section loops of the sub-meshes, and render, based on the cross-section loops of the sub-meshes, cross-sections of the sub-meshes — S105

Acquire a first target level selected for rendering a virtual object corresponding to the two-dimensional mesh data — S106A Acquire at least one target sub-mesh to be rendered in the first target level — S107A Render the at least one target sub-mesh to obtain a first rendering result — S108A

FIG. 6A

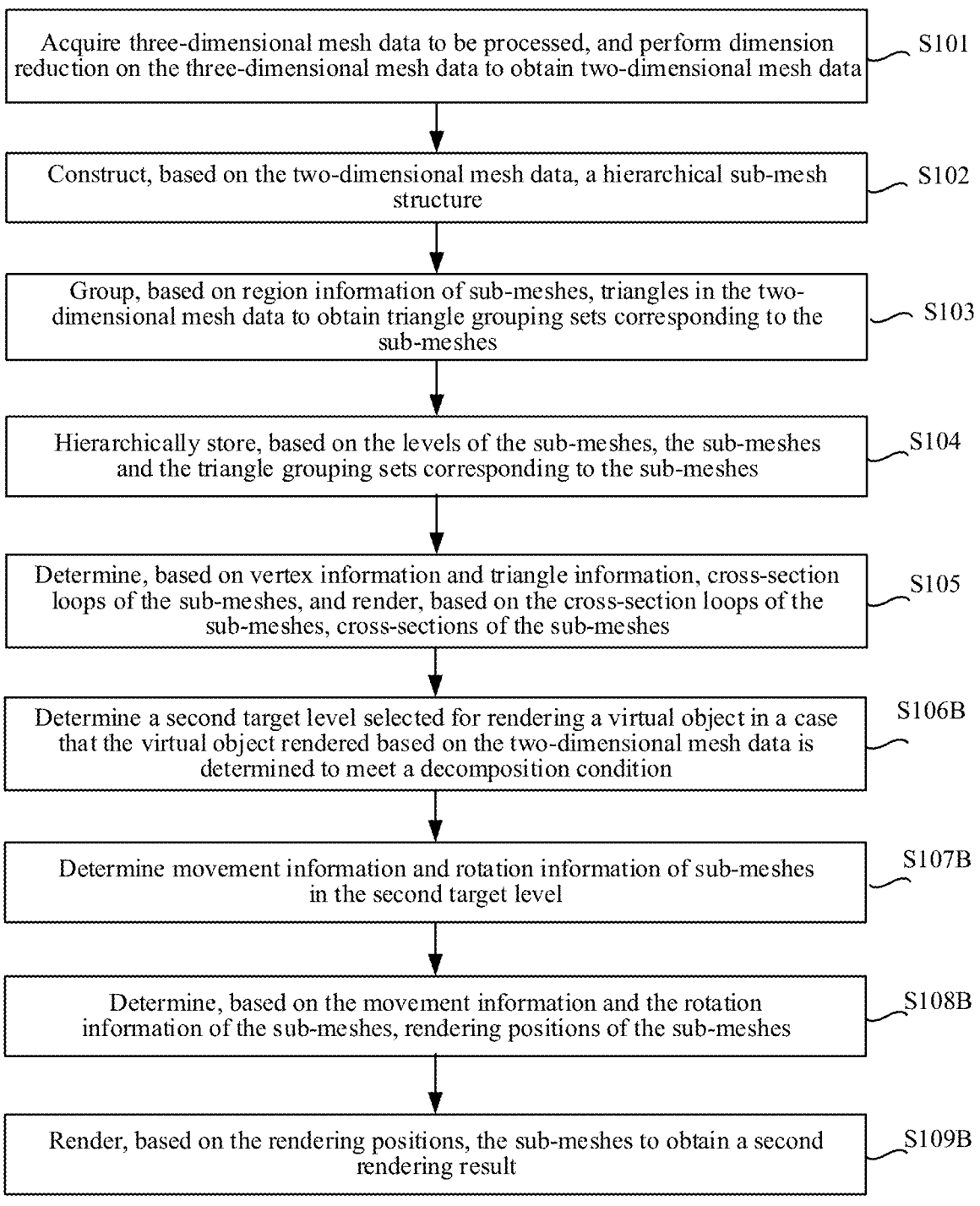

Acquire three-dimensional mesh data to be processed, and perform dimension reduction on the three-dimensional mesh data to obtain two-dimensional mesh data — S101

Construct, based on the two-dimensional mesh data, a hierarchical sub-mesh structure — S102

Group, based on region information of sub-meshes, triangles in the two-dimensional mesh data to obtain triangle grouping sets corresponding to the sub-meshes — S103

Hierarchically store, based on the levels of the sub-meshes, the sub-meshes and the triangle grouping sets corresponding to the sub-meshes — S104

Determine, based on vertex information and triangle information, cross-section loops of the sub-meshes, and render, based on the cross-section loops of the sub-meshes, cross-sections of the sub-meshes — S105

Determine a second target level selected for rendering a virtual object in a case that the virtual object rendered based on the two-dimensional mesh data is determined to meet a decomposition condition — S106B Determine movement information and rotation information of sub-meshes in the second target level — S107B Determine, based on the movement information and the rotation information of the sub-meshes, rendering positions of the sub-meshes — S108B Render, based on the rendering positions, the sub-meshes to obtain a second rendering result — S109B

FIG. 6B 501    502    503

S601: Reduce a three-dimensional mesh
to a two-dimensional mesh

S602: Determine centers of triangles in
the two-dimensional mesh

S603: Construct a sub-mesh hierarchy

S604: Perform triangle grouping on the
two-dimensional mesh

S605: Determine cross-section loops

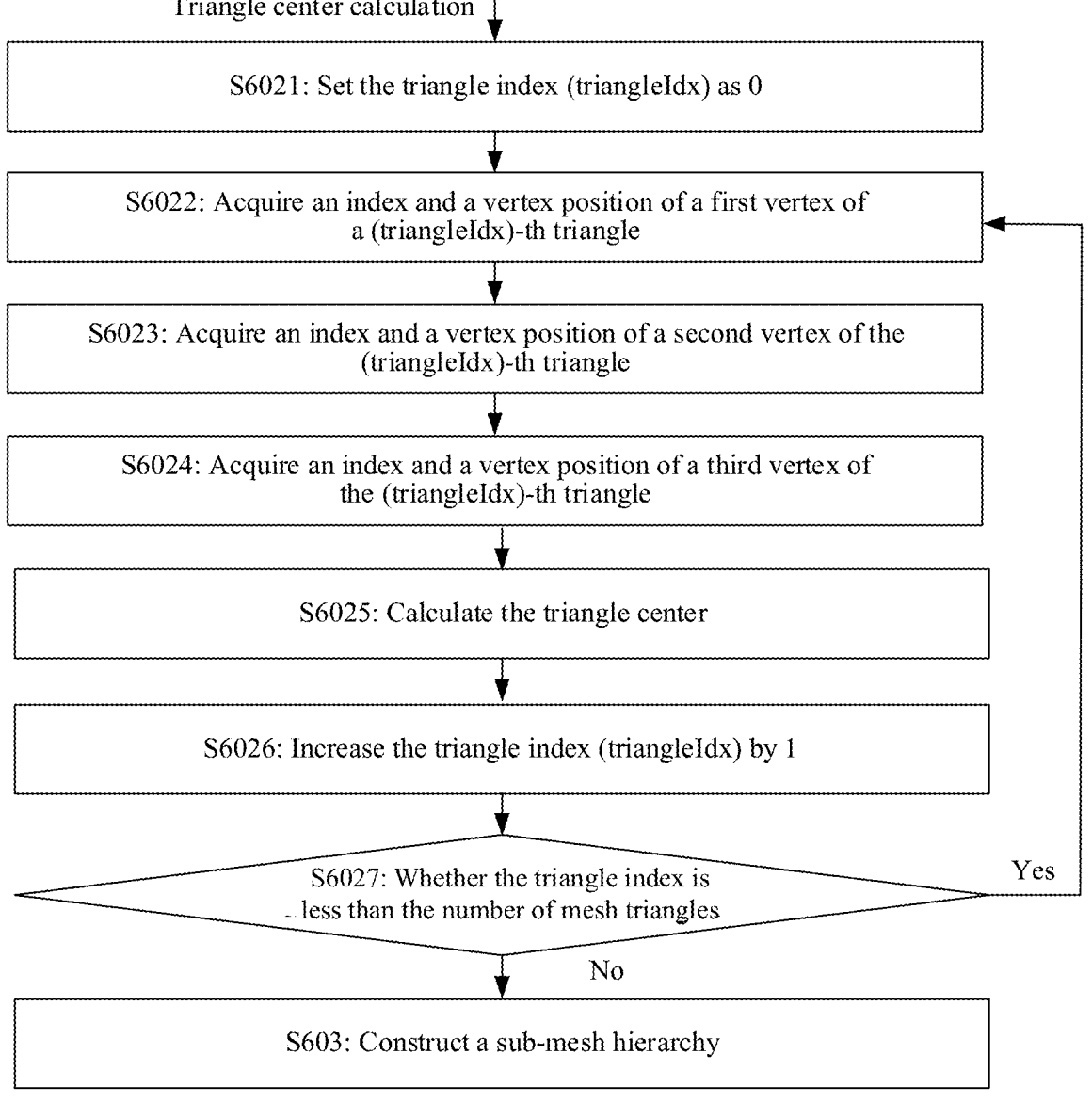

Triangle center calculation

S6021: Set the triangle index (triangleIdx) as 0

S6022: Acquire an index and a vertex position of a first vertex of
a (triangleIdx)-th triangle S6023: Acquire an index and a vertex position of a second vertex of the
(triangleIdx)-th triangle S6024: Acquire an index and a vertex position of a third vertex of
the (triangleIdx)-th triangle S6025: Calculate the triangle center S6026: Increase the triangle index (triangleIdx) by 1

S6027: Whether the triangle index is
less than the number of mesh triangles

Yes

No

S603: Construct a sub-mesh hierarchy

FIG. 8

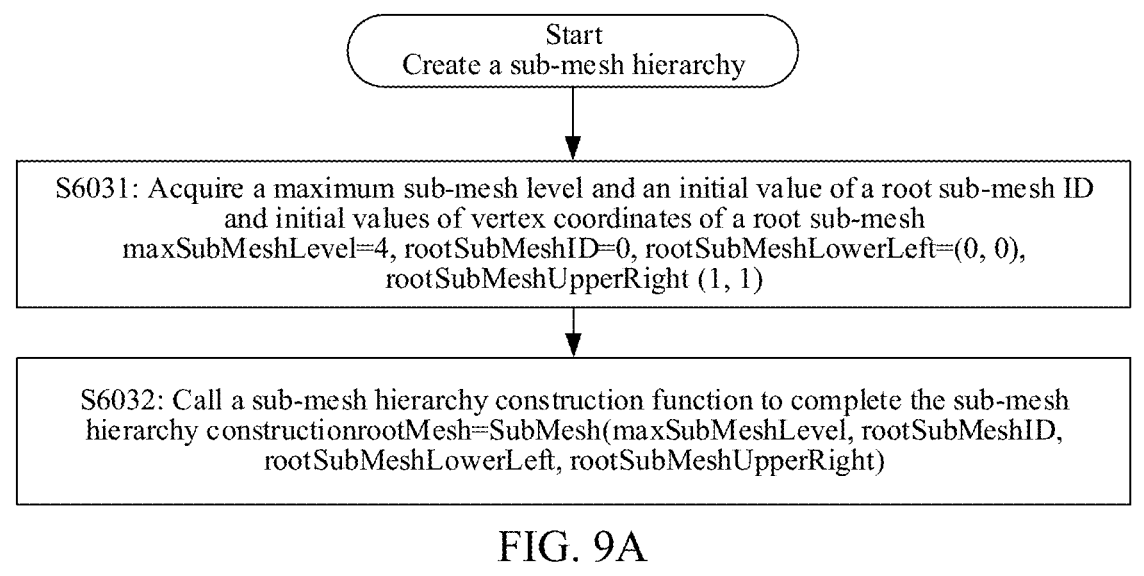

Start
Create a sub-mesh hierarchy

S6031: Acquire a maximum sub-mesh level and an initial value of a root sub-mesh ID and initial values of vertex coordinates of a root sub-mesh maxSubMeshLevel=4, rootSubMeshID=0, rootSubMeshLowerLeft=(0, 0), rootSubMeshUpperRight (1, 1)

S6032: Call a sub-mesh hierarchy construction function to complete the sub-mesh hierarchy constructionrootMesh=SubMesh(maxSubMeshLevel, rootSubMeshID, rootSubMeshLowerLeft, rootSubMeshUpperRight)

FIG. 9A

Start

S6041: Set mesh.triangles to SourceTriangle, and initialize a root sub-mesh ID to 0

S6042: Allocate triangle grouping sets to sub-meshes using a AddTriangle function

DATA PROCESSING METHOD AND APPARATUS, DEVICE, COMPUTER-READABLE STORAGE MEDIUM, AND COMPUTER PROGRAM PRODUCT

CROSS-REFERENCE TO RELATED APPLICATIONS

This application is a continuation application of International Application No. PCT/CN2022/128311, filed on Oct. 28, 2022, which claims priority to Chinese Patent Application No. 202210050745.3 filed with the China National Intellectual Property Administration on Jan. 17, 2022, the disclosures of each of which being incorporated by reference herein in their entireties.

FIELD

The disclosure relates to the field of data processing technology, and in particular to a data processing method and apparatus, a device, a computer-readable storage medium, and a computer program product.

BACKGROUND

In computer graphics applications, high precision three-dimensional mesh data is often required in order to present virtual objects as realistic as possible. However, the complexity of data is directly associated with the computational cost in rendering. In addition, in the related art, when a virtual object is rendered, the three-dimensional mesh data is rendered as a whole, and when decomposed display is desired for the virtual object, complex computation is required on the three-dimensional mesh data as a whole, which results in a long time for rendering and thus a stuttering of display.

SUMMARY

The disclosure provides a data processing method and apparatus, a computer-readable storage medium, and a computer program product to improve rendering efficiency.

Some embodiments provide a data processing method applied to a computer device, the method including:

acquiring three-dimensional mesh data to be processed, and performing dimension reduction on the three-dimensional mesh data to obtain two-dimensional mesh data, the two-dimensional mesh data including vertex information and triangle information;

constructing, based on the two-dimensional mesh data, a hierarchical sub-mesh structure having one or more levels, each level of the hierarchical sub-mesh structure comprising at least one sub-mesh;

performing, based on the at least one sub-mesh, grouping of triangles on the two-dimensional mesh data to obtain triangle grouping sets corresponding to the at least one sub-mesh;

hierarchically storing, based on levels corresponding to the at least one sub-mesh, the at least one sub-mesh and the triangle grouping sets corresponding to the at least one sub-mesh; and determining, based on the vertex information and the triangle information, cross-section loops of the at least one sub-mesh, and rendering, based on the cross-section loops, cross-sections of the at least one sub-mesh.

Some embodiments provide a data processing apparatus, the apparatus including: at least one memory configured to store program code; and at least one processor configured to read the program code and operate as instructed by the program code, the program code including:

dimension reduction code configured to cause at least one of the at least one processor to acquire three-dimensional mesh data to be processed, and perform dimension reduction on the three-dimensional mesh data to obtain two-dimensional mesh data, the two-dimensional mesh data comprising vertex information and triangle information;

hierarchical construction code configured to cause at least one of the at least one processor to construct, based on the two-dimensional mesh data, a hierarchical sub-mesh structure having one or more levels, each level of the hierarchical sub-mesh structure comprising at least one sub-mesh;

triangle grouping code configured to cause at least one of the at least one processor to perform, based on the at least one sub-mesh, grouping of triangles on the two-dimensional mesh data to obtain triangle grouping sets corresponding to the at least one sub-mesh;

hierarchical storage code configured to cause at least one of the at least one processor to hierarchically store, based on a level of each of the at least one sub-mesh, the at least one sub-mesh and the triangle grouping sets corresponding to the at least one sub-mesh; and first determination code configured to cause at least one of the at least one processor to determine, based on the vertex information and the triangle information, cross-section loops of each of the at least one sub-mesh, and render, based on the cross-section loops, cross-sections of each of the at least one sub-mesh.

Some embodiments provide a computer device, the computer device including:

a memory, configured to store executable instructions; and a processor, configured to implement, when executing the executable instructions stored in the memory, the data processing method provided in some embodiments.

Some embodiments provide a non-transitory computer-readable storage medium storing computer code that when executed by at least one processor causes the at least one processor to implement the data processing method provided in some embodiments.

Some embodiments provide a computer program product including computer programs or instructions which, when executed by a processor, implement the data processing method provided in some embodiments.

BRIEF DESCRIPTION OF THE DRAWINGS

To describe the technical solutions of some embodiments of this disclosure more clearly, the following briefly introduces the accompanying drawings for describing some embodiments. The accompanying drawings in the following description show only some embodiments of the disclosure, and a person of ordinary skill in the art may still derive other drawings from these accompanying drawings without creative efforts. In addition, one of ordinary skill would understand that aspects of some embodiments may be combined together or implemented alone.

FIG. 2 is a structural diagram showing an architecture of a data processing system according to some embodiments.

FIG. 3 is a structural diagram of a server 400 according to some embodiments.

FIG. 4 is a flow diagram of a data processing method according to some embodiments.

FIG. 5 is an implementation flow diagram of constructing a hierarchical sub-mesh structure according to some embodiments.

FIG. 6A is an implementation flow diagram of hierarchical rendering by using a data processing method according to some embodiments.

FIG. 6B is an implementation flow diagram of decomposed rendering by using a data processing method according to some embodiments.

FIG. 8 shows operations for determining center coordinates of triangles in a mesh.

FIG. 9A is an implementation flow diagram of constructing a sub-mesh hierarchy according to some embodiments.

DETAILED DESCRIPTION

Figure 1A:
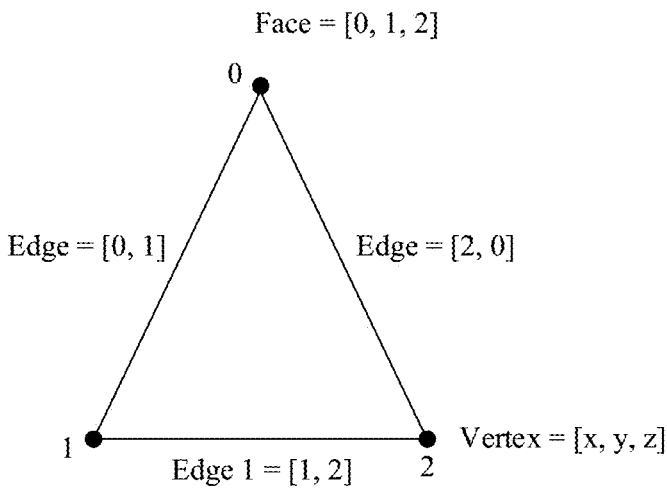
FIG. 1A is a schematic diagram of vertices, edges, and a face according to some embodiments.

To make the objectives, technical solutions, and advantages of the present disclosure clearer, the following further describes the present disclosure in detail with reference to the accompanying drawings. The described embodiments are not to be construed as a limitation to the present disclosure. All other embodiments obtained by a person of ordinary skill in the art without creative efforts shall fall within the protection scope of the present disclosure and the appended claims.

According to various embodiments, after acquiring the three-dimensional mesh data to be processed, dimension reduction is first performed on the three-dimensional mesh data to obtain two-dimensional mesh data, where the two-dimensional mesh data includes vertex information and triangle information, and then subsequent processing is performed based on the two-dimensional mesh data, which can effectively reduce the calculation amount and improve the calculation efficiency. Then a hierarchical sub-mesh structure is constructed based on the two-dimensional mesh data, each level of the sub-mesh structure including at least one sub-mesh, and then triangles in the two-dimensional mesh data are grouped based on region information of the sub-meshes to obtain triangle grouping sets corresponding to the sub-meshes, and the sub-meshes and the triangle grouping sets corresponding to the sub-meshes are hierarchically stored based on the levels of the sub-meshes. Finally, cross-section loops of the sub-meshes are determined based on the vertex information and the triangle information, and the cross-sections of the sub-meshes are rendered based on the cross-section loops of the sub-meshes. Since different levels of the sub-mesh structure include different number of sub-meshes, i.e., the sub-meshes of different levels are divided based on different granularities, and since the sub-meshes and the corresponding triangle grouping sets are hierarchically stored based on the levels of the sub-meshes, a corresponding hierarchical structure may be directly acquired when sub-meshes of a particular granularity need to be rendered; and since the cross-sections of the triangle grouping sets have been rendered in advance, display may be performed directly without calculation when decomposed rendering is needed, thereby improving rendering efficiency.

In the following description, the term "some embodiments" describes subsets of all possible embodiments, but it is to be understood that "some embodiments" may be the same subset or different subsets of all the possible embodiments, and can be combined with each other without conflict.

In the following description, references to the terms "first/second/third" are merely intended to distinguish between similar objects and do not denote a particular ordering of the objects. It is to be understood that the terms "first/second/third" may be interchanged either in a particular order or in a sequential order, as permitted, to enable embodiments of this application described herein to be implemented otherwise than as specifically illustrated or described herein.

Unless otherwise defined, meanings of all technical and scientific terms used herein are the same as those usually understood by a person skilled in the art to which this application belongs. The terms used herein are merely intended to describe embodiments of this application, but are not intended to limit this application.

Before the embodiments of this application are further described in detail, a description is made on nouns and terms in the embodiments of this application, and the following explanations are applicable to the nouns and terms in the embodiments of this application.

1). A vertex is a data structure containing a 2-dimensional position vector [x, y] or a 3-dimensional position vector [x, y, z].

2). A face is a data structure containing 3 indexed integers, the indices indicating the vertices used by the face vertices.

3). An edge is a data structure containing 2 indexed integers. Each face has 3 edges. FIG. 1A is a schematic diagram of vertices, edges, and a face. In FIG. 1A, three vertices 0, 1, 2, three edges including edge [0, 1], edge [1, 2], edge [2, 0], and a face [0, 1, 2] are included.

4). A mesh is a common way for displaying a 3D game object, and the mesh is a data structure containing a vertex array and a face array.

Figure 1B:
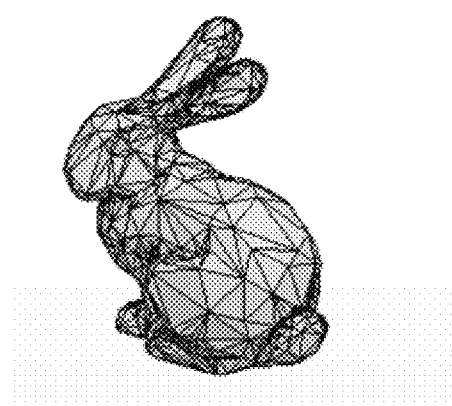
FIG. 1B is a schematic diagram of a three-dimensional mesh according to some embodiments.

5). A three-dimensional mesh is a data structure containing a vertex array and a face array. FIG. 1B is a schematic diagram of a three-dimensional mesh in which each vertex contains a 3-dimensional spatial vector that characterizes the position [x, y, z] of the vertex.

Figure 1C:
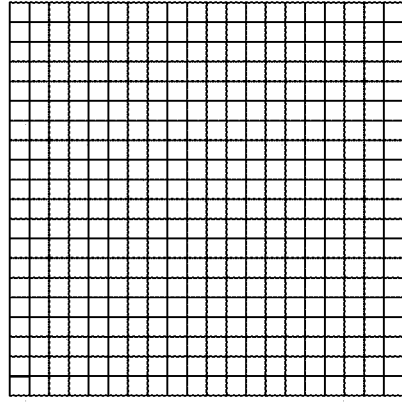
FIG. 1C is a schematic diagram of a two-dimensional mesh according to some embodiments.

6). A two-dimensional mesh is a data structure containing a vertex array and a face array. FIG. 1C is a schematic diagram of a two-dimensional mesh in which each vertex contains a 2-dimensional spatial vector that characterizes the position [x, y] of the vertex.

Figure 1D:
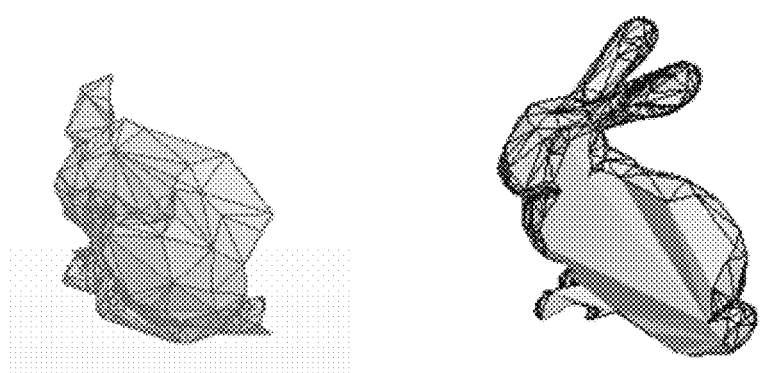
FIG. 1D is a schematic diagram of sub-meshes according to some embodiments.

7). Sub-meshes refer to fewer meshes separated from a mesh. FIG. 1D is a schematic diagram of sub-meshes which includes two sub-meshes separated from the three-dimensional mesh shown in FIG. 1B.

Figure 1E:
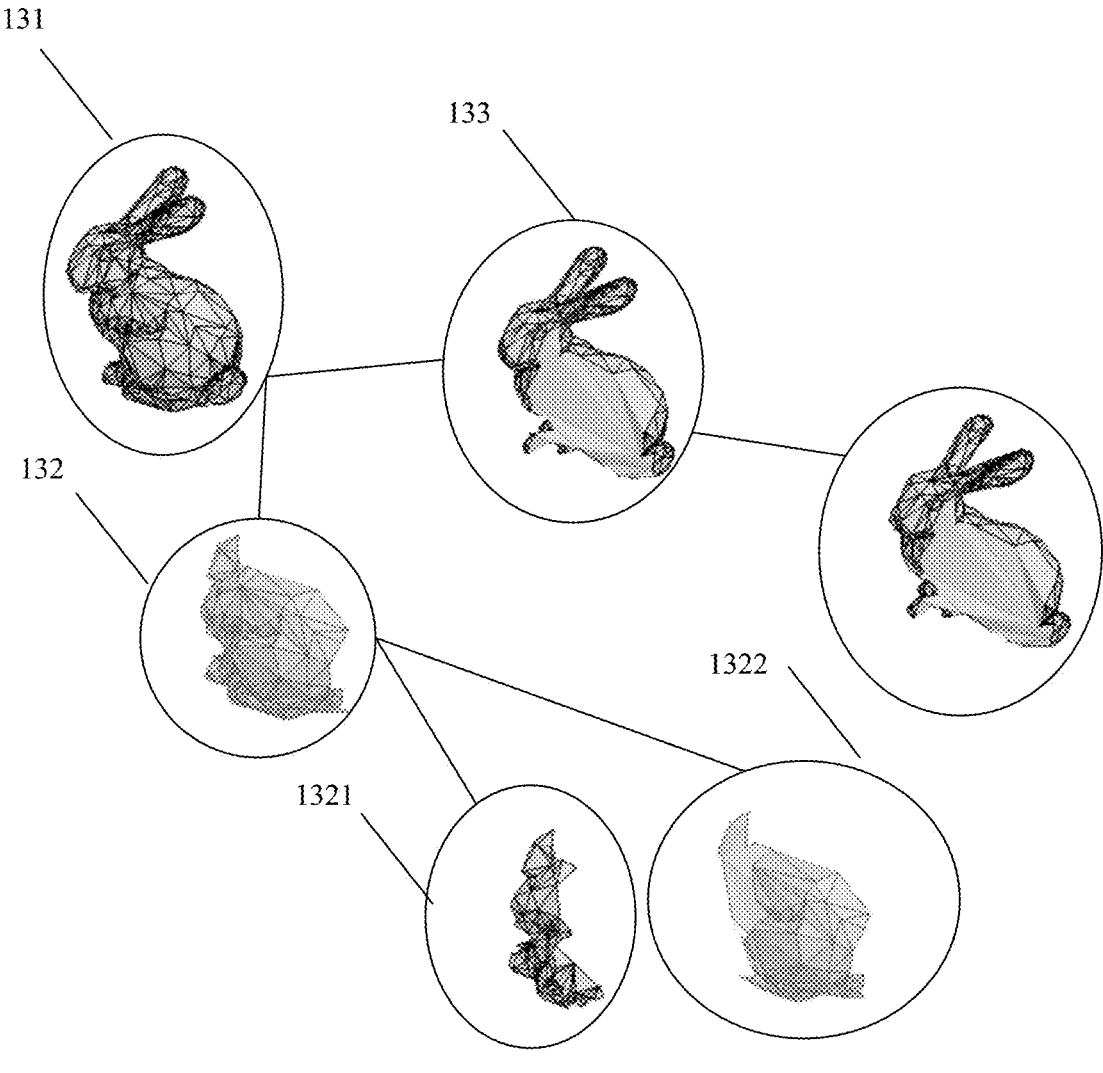
FIG. 1E is a schematic diagram of obtaining a spatial hierarchical data structure by segmenting a three-dimensional mesh according to some embodiments.

8). A three-dimensional spatial hierarchical data structure refers to grouping, through spatial segmenting and other means, three-dimensional vertices and placing the vertices in separate data structures. FIG. 1E is a schematic diagram of obtaining a spatial hierarchical data structure by segmenting a three-dimensional mesh. As shown in FIG. 1E, a three-dimensional mesh 131 can be segmented to obtain 132 and 133, and 132 is further segmented to obtain 1321 and 1322.

Figures 1F, 1G:
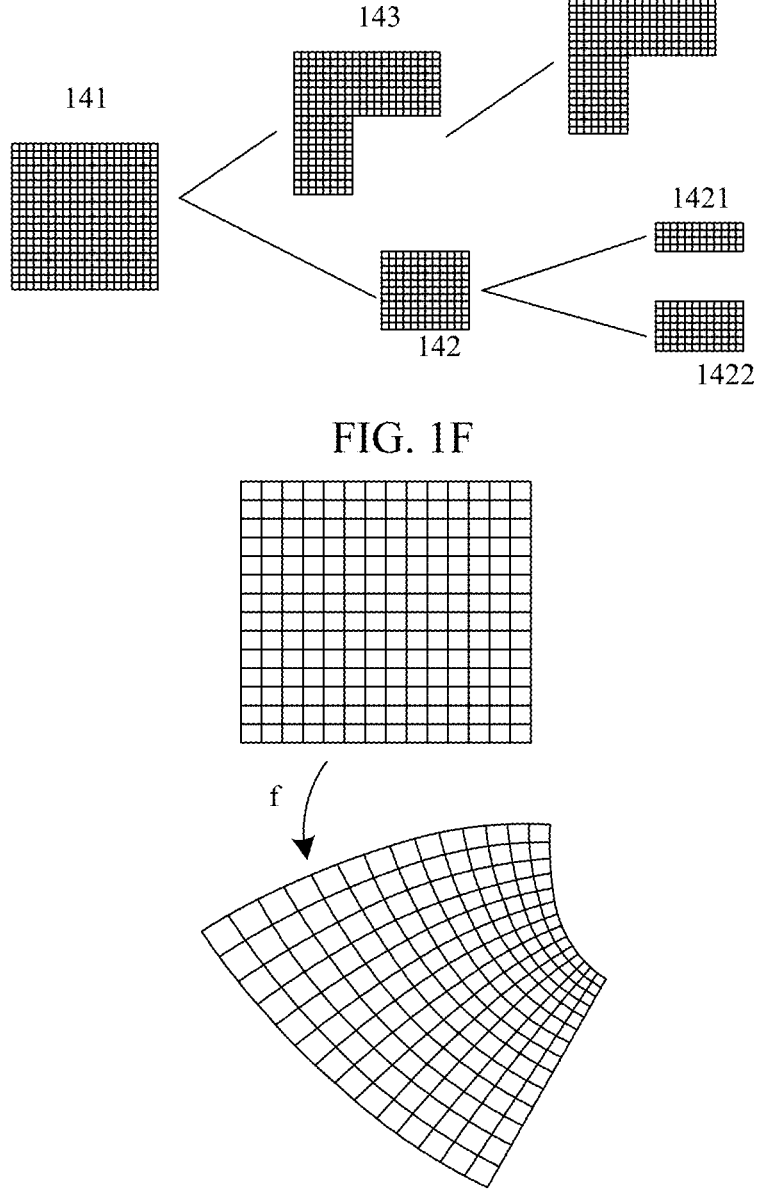
FIG. 1F is a schematic diagram of obtaining a spatial hierarchical data structure by segmenting a two-dimensional mesh according to some embodiments.
FIG. 1G is a schematic diagram of a conformal mapping according to some embodiments.

9). A two-dimensional spatial hierarchical data structure refers to grouping, through spatial segmenting and other means, two-dimensional vertices and placing the vertices in separate data structures. FIG. 1F is a schematic diagram of obtaining a spatial hierarchical data structure by segmenting a two-dimensional mesh. As shown in FIG. 1F, a two-dimensional mesh 141 can be segmented to obtain 142 and 143, and 142 is further segmented to obtain 1421 and 1422.

10). A conformal map, also referred to as angle preserving map or conformal mapping, comes from the concepts of fluid mechanics and geometry, and is an angle-invariant mapping. A mapping can be referred to as a conformal (or angle preserving) map if it preserves the orientation angle and direction among the passing curves. The conformal map preserves the angle and the shape of an infinitesimal object, but does not necessarily preserve its size. The nature of conformality can be expressed in terms of Jacobian matrix, the derivative matrix of coordinate transformation. A map is conformal if the Jacobian matrix is everywhere a scalar multiplied by a rotation matrix. FIG. 1G is a schematic diagram of a conformal mapping.

11). For a triangle vertex index, a mesh contains a vertex array, each vertex being a 3-dimensional vector (x, y, z). A triangle contains 3 indices (0, i1, i2), all of which are used to index the vertex array to obtain the positions of the triangle vertices.

Figures 1H, 1I:
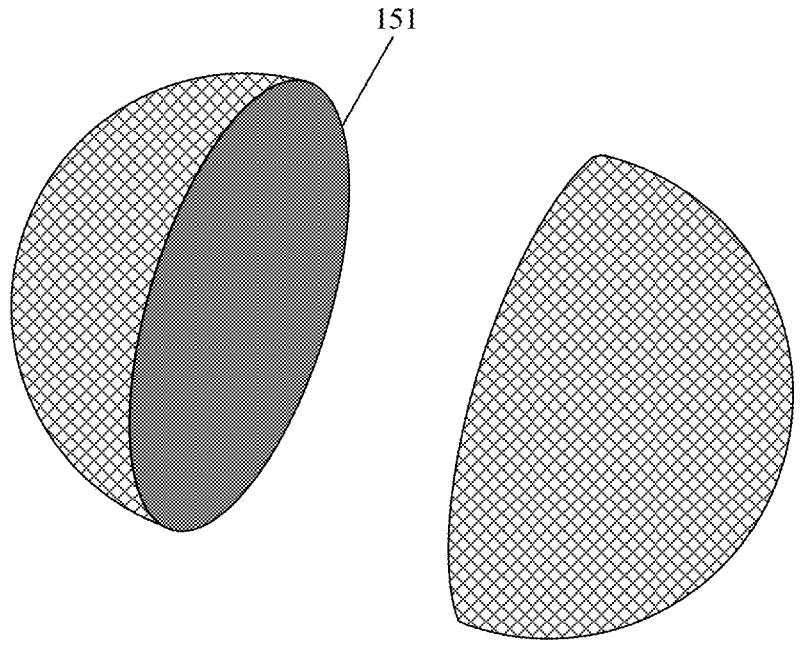
FIG. 1H is a schematic diagram of a cross-section according to some embodiments.
FIG. 1I is a schematic diagram of a cross-section profile loop according to some embodiments.

12). A cross-section is a visible surface after the mesh is divided. FIG. 1H is a schematic diagram of a cross-section, in which the cross-section is 151, and the cross-section 151 was originally hidden in the sphere.

13). A cross-section profile loop, also referred to as a cross-section loop in the embodiments of this application, is an outer cross-section edge profile that consists of an index array. FIG. 1I is a schematic diagram of a cross-section profile loop, in which the cross-section profile loop is 161.

14). A quad tree is a tree data structure which has four sub-blocks at each node. The quad tree is often used in analysis and classification of two-dimensional spatial data. The data field may have square or rectangular shape or any other shapes. All quad tree methods have common features. The quad tree can be decomposed into individual blocks, each block having a node capacity. The node splitting tree data structures are differentiated according to the quad tree methods when the nodes reach the maximum capacity.

Some embodiments provide a data processing method and apparatus, a device, a computer-readable storage medium, and a computer program product to improve rendering efficiency. Some exemplary applications of the computer device provided in some embodiments will be described below. The computer device provided in some embodiments can be implemented as various types of user terminals, such as a notebook computer, a tablet computer, a desktop computer, a set-top box, a mobile device (e.g., a mobile phone, a portable music player, a personal digital assistant, a dedicated messaging device, a portable game device), and the like, and can also be implemented as a server. An exemplary application will be illustrated below with the device being implemented as a server.

FIG. 2 shows an architectural diagram of a data processing system 100 according to some embodiments. As shown in FIG. 2, the data processing system 100 includes a terminal 200, a network 300, and a server 400. The terminal 200 is designed to be connected to the server 400 via the network 300, where the network 300 may be a wide area network or a local area network, or a combination thereof.

The terminal 200 can be a terminal configured to design a virtual scene or a virtual character. A designer may complete the design of the virtual scene and the virtual character by using the design terminal so as to obtain corresponding three-dimensional mesh data which is then sent to the server 400. After receiving the three-dimensional mesh data, the server 400 first performs dimension reduction to obtain two-dimensional mesh data, and then constructs a hierarchical sub-mesh structure based on the two-dimensional mesh data, and groups triangles in the two-dimensional mesh data to obtain a plurality of triangle grouping sets. In the embodiments of this application, cross-section loops of the triangle grouping sets are further determined, and corresponding cross-sections of the cross-section loops are rendered in advance. The server 400 further hierarchically stores the sub-meshes and the corresponding triangle grouping sets based on the levels of the sub-meshes, so a corresponding hierarchical structure may be directly acquired when sub-meshes of a particular granularity need to be rendered; and since the cross-sections of the triangle grouping sets have been rendered in advance, display may be performed directly without calculation when decomposed rendering is needed, thereby improving rendering efficiency.

In some embodiments, the server 400 may be an independent physical server, a server cluster or distributed system formed by a plurality of physical servers, or a cloud server that provides basic cloud computing services, such as cloud services, cloud databases, cloud computing, cloud functions, cloud storage, network services, cloud communication, middleware services, domain name services, security services, CDN, big data, and artificial intelligence platforms. The terminal 200 may be a smart phone, a tablet computer, a notebook computer, a desktop computer, a smart speaker, a smart watch, a smart vehicle device, etc., but is not limited thereto. The terminal and the server can be directly or indirectly connected through wired or wireless communication, which is not limited herein.

FIG. 3 shows a structural diagram of a server 400 according to some embodiments, where the server 400 shown in FIG. 3 includes: at least one processor 410, at least one network interface 420, a bus system 430, and a memory 440. Components in the server 400 are coupled together via the bus system 430. It is to be understood that the bus system 430 is configured to enable connection and communication among these components. The bus system 430 includes a power bus, a control bus, and a status signal bus in addition to a data bus. However, various buses are labeled in FIG. 3 as the bus system 430 for clarity.

The processor 410 may be an integrated circuit chip having signal processing capabilities, such as a general-purpose processor, a DSP (Digital Signal Processor), or other programmable logic devices, discrete gate or transistor logic devices, discrete hardware components, etc., where the general-purpose processor may be a microprocessor or any conventional processor.

The memory 440 may be removable, non-removable, or a combination thereof. Exemplary hardware devices include solid state memories, hard disk drives, optical disk drives, and the like. In some embodiments, the memory 440 may include one or more storage devices physically positioned remote from the processor 410.

The memory 440 includes either volatile or nonvolatile memory, and may include both volatile and nonvolatile memory as well. The non-volatile memory may be a read-only memory (ROM) and the volatile memory may be a random access memory (RAM). The memory 440 described in the embodiments of this application is intended to include any suitable type of memory.

In some embodiments, the memory 440 is capable of storing data to support various operations, examples of which including programs, modules, and data structures or subsets or superset thereof, as exemplified below.

An operation system 441 includes a system program for processing various basic system services and performing hardware-related tasks, such as a framework layer, a core library layer, a driver layer, etc., for implementing various basic services and processing hardware-based tasks.

A network communication module 442 is configured to reach other computing devices via one or more (wired or wireless) network interfaces 420. Exemplary network interfaces 420 include: Bluetooth, wireless compatibility authentication (WiFi), and USB (Universal Serial Bus).

In some embodiments, the apparatus may be implemented in software. FIG. 3 shows a data processing apparatus 443 stored in the memory 440, which may be software in the form of a program, a plug-in, and the like. The apparatus includes the following software modules: a dimension reduction module 4431, a hierarchical construction module 4432, a triangle grouping module 4433, a hierarchical storage module 4434, and a first determination module 4435, where these modules are logical, and therefore, any combination or further division thereof can be performed based on the functions to be implemented. The functions of the modules will be described below.

In other embodiments, the apparatus provided in some embodiments may be implemented in hardware. The apparatus provided in some embodiments may be a processor in the form of a hardware decoding processor programmed to perform the data processing method provided in some embodiments. For example, the processor in the form of the hardware decoding processor may adopt one or more of an ASIC (Application Specific Integrated Circuit), a DSP, a PLD (Programmable Logic Device), a CPLD (Complex Programmable Logic Device), a FPGA (Field-Programmable Gate Array), or other electronics.

The data processing method provided in some embodiments will be described in connection with the exemplary application and implementation of the server provided in some embodiments.

Some embodiments provide a data processing method, where the data processing method can be implemented by a computer device which can be a terminal or a server, and the computer device is exemplified as a server in some embodiments. FIG. 4 is an implementation flow diagram of a data processing method according to some embodiments. The data processing method provided in some embodiments will be illustrated below in connection with the operations shown in FIG. 4.

Operation S101: Acquire three-dimensional mesh data to be processed, and perform dimension reduction on the three-dimensional mesh data to obtain two-dimensional mesh data.

The mesh data is a data structure including vertex data and face array, and a three-dimensional virtual object can be constructed through the three-dimensional mesh data. The three-dimensional mesh data differs from the two-dimensional mesh data in that in the three-dimensional mesh data, each vertex position coordinate in the vertex data is characterized by a three-dimensional spatial vector $[x, y, z]$, while in the two-dimensional mesh data, each vertex position coordinate in the vertex data is characterized by a two-dimensional spatial vector $[x, y]$. In implementing dimension reduction on the three-dimensional mesh data to obtain the two-dimensional mesh data, a preset mapping function is used to convert three-dimensional vertex position coordinates into two-dimensional vertex position coordinates.

The two-dimensional mesh data includes vertex information and triangle information. The vertex information may be a vertex array, where the vertex array includes a plurality of vertex indices, and may further include vertex position coordinates (i.e., two-dimensional vertex position vectors) corresponding to the vertex indices; and the triangle information may be a triangle array (also referred to as a face array), where the triangle array includes vertex indices of the triangles.

Operation S102: Construct, based on the two-dimensional mesh data, a hierarchical sub-mesh structure.

Different levels of the sub-mesh structure include different number of sub-meshes. In some embodiments, the initial two-dimensional mesh data may be determined as a first-level sub-mesh; then the initial two-dimensional mesh data is divided to obtain a plurality of second-level sub-meshes; then the division of the second-level sub-meshes is continued to obtain a plurality of third-level sub-meshes; and the division is continued until a preset level number is obtained, thereby obtaining the hierarchical sub-mesh structure. Since the sub-meshes of each level (except the first-level sub-mesh) are obtained by dividing the sub-meshes of a previous level, the number of sub-meshes varies among different levels of the sub-mesh structure.

Operation S103: Perform, based on the sub-meshes, triangle grouping on the two-dimensional mesh data to obtain triangle grouping sets corresponding to the sub-meshes.

In implementing operation S103, triangle grouping may be performed on the two-dimensional mesh data based on region information of the sub-meshes, where the region information of the sub-mesh may refer to vertex coordinates of a minimum rectangular region capable of surrounding the sub-mesh, and may be, for example, the vertex coordinate of the lower left vertex and the vertex coordinate of the upper right vertex of the minimum rectangular region.

In performing triangle grouping on the two-dimensional mesh data based on the region information of the sub-meshes, center coordinates of the triangles in the two-dimensional mesh data are firstly determined, and then the triangle grouping sets corresponding to the sub-meshes of individual levels are determined based on the level order. In some embodiments, the triangles positioned in the rectangular region where the sub-mesh is positioned may constitute the triangle grouping set corresponding to the sub-mesh.

Operation S104: Hierarchically store, based on the levels of the sub-meshes, the sub-meshes and the triangle grouping sets corresponding to the sub-meshes.

That is, a first-level sub-mesh and a triangle grouping set corresponding to the first-level sub-mesh are stored, second-level sub-meshes and triangle grouping sets corresponding to the second-level sub-meshes are stored separately, and so on. Since sub-meshes of different levels are divided based on different granularities, and since the sub-meshes and the corresponding triangle grouping sets are hierarchically stored based on the levels of the sub-meshes, a corresponding hierarchical structure may be directly acquired when sub-meshes of a particular granularity need to be rendered, thereby improving rendering efficiency.

Operation S105: Determine, based on the vertex information and the triangle information, cross-section loops of the sub-meshes, and render, based on the cross-section loops of the sub-meshes, cross-sections of the sub-meshes.

In implementing operation S105, connection edges existing at the margin in the two-dimensional mesh can be determined based on the vertex information and the triangle information, and the cross-section loops of the sub-meshes can be determined based on the connection edges existing only at the margin, i.e., a cross-section loop includes connection edges (target edges) existing only in one triangle. Then corresponding cross-sections are determined based on the cross-section loops of the sub-meshes. A cross-section is a visible surface after separating different meshes, and the cross-section is hidden inside and invisible when a virtual object corresponding to the two-dimensional mesh data is normally rendered. In the related art, the cross-section hidden inside is not rendered when rendering the virtual object, and only when the cross-section is visible, the displayed cross-section is determined and rendered. In some embodiments, the cross-sections of the sub-meshes are rendered when the virtual object corresponding to the two-dimensional mesh data is rendered, so that display may be performed directly without decomposition calculation and rendering when the virtual object needs decomposed display, thereby improving rendering efficiency.

In the data processing method provided in some embodiments, after acquiring the three-dimensional mesh data to be processed, dimension reduction is first performed on the three-dimensional mesh data to obtain two-dimensional mesh data, where the two-dimensional mesh data includes vertex information and triangle information, and then subsequent processing is performed based on the two-dimensional mesh data, which can effectively reduce the calculation amount and improve the calculation efficiency. Then a hierarchical sub-mesh structure is constructed based on the two-dimensional mesh data, each level of the sub-mesh structure including at least one sub-mesh, and then triangles in the two-dimensional mesh data are grouped based on region information of the sub-meshes to obtain triangle grouping sets corresponding to the sub-meshes, and the sub-meshes and the triangle grouping sets corresponding to the sub-meshes are hierarchically stored based on the levels of the sub-meshes. Finally, cross-section loops of the sub-meshes are determined based on the vertex information and the triangle information, and the cross-sections of the sub-meshes are rendered based on the cross-section loops of the sub-meshes; since different levels of the sub-mesh structure include different number of sub-meshes, i.e., the sub-meshes of different levels are divided based on different granularities, and since the sub-meshes and the corresponding triangle grouping sets are hierarchically stored based on the levels of the sub-meshes, a corresponding hierarchical structure may be directly acquired when sub-meshes of a particular granularity need to be rendered; and since the cross-sections of the triangle grouping sets have been rendered in advance, display may be performed directly without calculation when decomposed rendering is needed, thereby improving rendering efficiency.

In some embodiments, "performing dimension reduction on the three-dimensional mesh data to obtain two-dimensional mesh data" of operation S101 above can be implemented by operations S1011 to S1013 which are described below.

Operation S1011: Acquire a preset conformal mapping function.

Conformal mapping is a branch of complex variable function theory, which studies complex variable functions from a geometric point of view. One region can be mapped to another region for research through the conformal mapping function. This nature can map some irregular or poorly mathematically expressed region boundaries to regular or mature region boundaries. In some embodiments, the preset conformal mapping function is capable of mapping three-dimensional space to two-dimensional space with invariant angles.

Operation S1012: Acquire three-dimensional coordinate information of vertices from the three-dimensional mesh data.

In some embodiments, corresponding three-dimensional coordinate information may be acquired based on vertex indices of the vertices, the three-dimensional coordinate information characterizing the positions of the vertices in the three-dimensional space.

Operation S1013: Perform conformal mapping on the three-dimensional coordinate information of the vertices using the conformal mapping function to obtain two-dimensional coordinate information of the vertices.

In some embodiments, the two-dimensional coordinate information of the vertices may be obtained by substituting the three-dimensional coordinate information of the vertices into the conformal mapping function.

Through operations S1011 to S1013 above, dimension reduction is performed on the three-dimensional mesh data with the conformal mapping function to obtain the two-dimensional mesh data, and subsequent processing is performed based on the two-dimensional mesh data, which can effectively reduce the calculation amount and improve the calculation efficiency.

In some embodiments, "constructing, based on the two-dimensional mesh data, a hierarchical sub-mesh structure" of operation S102 above can be implemented by operations S1021 to S1025 shown in FIG. 5 which are described below in conjunction with FIG. 5.

Operation S1021: Determine a mesh corresponding to the two-dimensional mesh data as a first-level sub-mesh.

Operation S1022: Acquire vertex coordinates and center coordinates of $i^{th}$ target regions corresponding to $i^{th}$-level sub-meshes.

In some embodiments, the $i^{th}$-level sub-meshes each correspond to an $i^{th}$ target region, and the vertex coordinates and the center coordinates of the $i^{th}$ target regions corresponding to the $i^{th}$-level sub-meshes are acquired in this operation; i=1, 2, . . . , (N−1), N being a preset level number, and N being an integer greater than 1.

When i is 1, this operation acquires the vertex coordinates and the center coordinate of the first target region corresponding to the first-level sub-mesh. The first target region corresponding to the first-level sub-mesh is a minimum rectangular region containing all the triangles in the mesh. The vertex coordinates of the first target region can be the coordinate of the lower left vertex and the coordinate of the upper right vertex, or can be coordinates of four vertices. The center coordinate can be determined based on the coordinate of the lower left vertex and the coordinate of the upper right vertex. Assuming that the coordinate of the lower left vertex is $(x_1, y_1)$ and the coordinate of the upper right vertex is $(x_2, y_2)$, the center coordinate of the first target region is $((x_1+x_2)/2, (y_1+y_2)/2)$.

For example, when i is 2, there are 4 second-level sub-meshes, and vertex coordinates and center coordinates of second target regions corresponding to these 4 sub-meshes are determined in this operation.

Operation S1023: Divide, based on the vertex coordinates and the center coordinates of the $i^{th}$ target regions, the $i^{th}$-level sub-meshes to obtain a plurality of $(i+1)^{th}$-level sub-meshes.

If i is 1, the first-level sub-mesh can be divided into two parts in implementing operation S1023. For example, the division can be performed along the length direction of the rectangle based on the center coordinate, or the division can be performed along the width direction of the rectangle based on the center coordinate. In some embodiments, the first-level sub-mesh may be divided into four parts. For example, the division can be performed along both the length direction and the width direction of the rectangle based on the center coordinate, resulting in four second-level sub-meshes.

In some embodiments, sub-mesh identifiers are provided for sub-meshes of each level. Assuming that each sub-mesh is further divided into four sub-meshes, an identifier of a first-level sub-mesh is 0, and that identifiers of second-level sub-meshes are 4*(a parent-mesh identifier of a previous level)+1, 4*(a parent-mesh identifier of a previous level)+2, 4*(a parent-mesh identifier of a previous level)+3, and 4*(a parent-mesh identifier of the previous level)+4, the identifiers of four second-level sub-meshes are 1, 2, 3, and 4, separately. Identifiers of four third-level sub-meshes obtained by further dividing the sub-mesh with the identifier being 1 are 5, 6, 7, and 8, separately. Identifiers of four third-level sub-meshes obtained by further dividing the second-level sub-mesh with the sub-mesh identifier being 2 are 9, 10, 11, and 12, separately, and so on. Identifiers of four third-level sub-meshes obtained by further dividing the second-level sub-mesh with the sub-mesh identifier being 3 are 13, 14, 15, and 16, separately. Identifiers of four third-level sub-meshes obtained by further dividing the second-level sub-mesh with the sub-mesh identifier being 4 are 17, 18, 19, and 20, separately.

When $i^{th}$-level sub-meshes are divided to obtain the $(i+1)^{th}$-level sub-meshes, each of the $i^{th}$-level sub-meshes is divided, and each sub-mesh is further divided to obtain an equal number of sub-meshes. For example, second-level sub-meshes are obtained by dividing the first-level sub-mesh into four parts, i.e., the second-level sub-meshes include four sub-meshes. When the second-level sub-meshes are divided to obtain third-level sub-meshes, each of the four second-level sub-meshes is further divided into four sub-meshes, so the third-level sub-meshes include 16 sub-meshes. The hierarchical sub-mesh structure is constructed by operations S1021 to S1023 above so as to provide necessary data foundation for subsequent triangle grouping.

In some embodiments, "performing, based on the sub-meshes, triangle grouping on the two-dimensional mesh data to obtain triangle grouping sets corresponding to the sub-meshes" of operation S103 above can be implemented by following operations:

Operation S1031: Determine, based on the vertex information and the triangle information, center coordinates of triangles.

In implementing operation S1031, three vertex coordinates of each triangle are acquired from the vertex information based on the vertex indices of the triangles included in the triangle information, and then the center coordinate of each triangle is determined based on the three vertex coordinates of the triangle.

Assuming that the three vertex coordinates of a triangle are $(x_{t1}, y_{t1})$, $(x_{t2}, y_{t2})$, and $(x_{t3}, y_{t3})$, separately, the center coordinate of the triangle is $((x_{t1}+x_{t2}+x_{t3})/3, (y_{t1}+y_{t2}+y_{t3})/3)$.

Operation S1032: Acquire, based on region information of the sub-meshes, vertex coordinates of a $j^{th}$ sub-mesh; j=1, 2, . . . , M, M being a total number of the sub-meshes, and M being a positive integer. The region information of the sub-mesh refers to vertex coordinates of a minimum rectangular region capable of surrounding the sub-mesh, and the vertex coordinates of the $j^{th}$ sub-mesh may be diagonal vertex coordinates of the corresponding rectangular region of the $j^{th}$ sub-mesh, for example, the coordinate of the lower left vertex and the coordinate of the upper right vertex, or the coordinate of the upper left vertex and the coordinate of the lower right vertex.

Operation S1033: Allocate, based on the center coordinates of the triangles and the vertex coordinates of the $j^{th}$ sub-mesh, triangles with center coordinates positioned in the target region corresponding to the $j^{th}$ sub-mesh to the triangle grouping set corresponding to the $j^{th}$ sub-mesh.

In implementing operation S1033, the center coordinate of each triangle is compared with the vertex coordinates of the $j^{th}$ sub-mesh, so as to determine whether the triangle is positioned in the target region corresponding to the $j^{th}$ sub-mesh. Assuming that the coordinate of the lower left vertex of the target region corresponding to the $j^{th}$ sub-mesh is $(x_1, y_1)$ and the coordinate of the upper right vertex is $(x_2, y_2)$ and a center coordinate of a triangle is $(x_{c1}, y_{c1})$, the triangle is determined to be positioned in the target region corresponding to the $j^{th}$ sub-mesh or not through determining whether $x_1<x_{c1}<x_2$ and $y_1<y_{c1}<y_2$ are satisfied in some embodiments; when $x_1<x_{c1}<x_2$ and $y_1<y_{c1}<y_2$ are satisfied, the triangle is determined to be positioned in the target region corresponding to the $j^{th}$ sub-mesh, and the triangle is allocated to the triangle grouping set corresponding to the $j^{th}$ sub-mesh; and when $x_1<x_{c1}<x_2$ and $y_1<y_{c1}<y_2$ are not satisfied, the triangle is determined to be not positioned in the target region corresponding to the $j^{th}$ sub-mesh, and a next triangle is then determined to be positioned in the target region corresponding to the $j^{th}$ sub-mesh or not.

Since sub-meshes of different levels are divided based on different granularities, triangles positioned in each sub-mesh can be determined based on the center coordinates of the triangles through operations S1031 to S1033 above after the sub-meshes are divided. When it is necessary to render contents of part of the sub-meshes later, the data corresponding to these sub-meshes can be directly rendered, thereby improving rendering efficiency.

In some embodiments, "determining, based on the vertex information and the triangle information, center coordinates of triangles" of operation S1031 above can be implemented by operations S311 to S313 which are described below.

Operation S311: Determine, based on the vertex information and the triangle information, three vertex coordinates of each triangle.

In implementing operation S311, vertex indices of triangles can be acquired from a triangle array corresponding to the triangle information, and then vertex coordinates corresponding to the vertex indices are acquired from the vertex information based on the vertex indices of the triangles, where the vertex coordinates each include a first vertex coordinate value and a second vertex coordinate value, i.e., the vertex coordinates are two-dimensional position vectors. For example, a vertex has a vertex coordinate of $(x_{d1}, y_{d1})$, where the first vertex coordinate value is $x_{d1}$ and the second vertex coordinate value is $y_{d1}$.

Operation S312: Determine, based on three first vertex coordinate values of each of the triangles, first center coordinate values of the triangles.

In some embodiments, three first vertex coordinate values of a triangle may be arithmetically averaged to obtain a first center coordinate value of the triangle. For example, if a first triangle has three first vertex coordinate values of $x_{d1}$, $x_{d2}$, and $x_{d3}$, the triangle has a first center coordinate value of $(x_{d1}+x_{d2}+x_{d3})/3$.

Operation S313: Determine, based on three second vertex coordinate values of each of the triangles, second center coordinate values of the triangles.

Similar to operation S312, in implementing operation S313, three second vertex coordinate values of the triangle may be arithmetically averaged to obtain a second center coordinate value of the triangle. For example, if the first triangle has three first vertex coordinate values of $y_{d1}$, $y_{d2}$, $y_{d3}$, the triangle has a first center coordinate value of $(y_{d1}+y_{d2}+y_{d3})/3$.

Through operations S311 to S313 above, the center coordinates of triangles can be calculated, so that in the subsequent process, the triangle grouping is performed using the center coordinates of the triangles instead of using the three vertex coordinates, which can greatly reduce the calculation amount and improve the calculation efficiency.

In some embodiments, "determining, based on the vertex information and the triangle information, cross-section loops of the sub-meshes" of operation S105 can be implemented by following operations:

Operation S1051: Determine, based on the vertex information and the triangle information, target edges in the triangle grouping sets.

In implementing this operation, sharing numbers of connection edges included in the triangle grouping sets are first determined, the sharing number being able to characterize whether a connection edge exists in only one triangle or in two triangles, and then the target edges existing on only one triangle are determined based on the sharing numbers.

Operation S1052: Determine target edges which are connected end to end and form closed loops from a plurality of target edges in the triangle grouping sets.

The target edges in the triangle grouping sets are identified through operation S1051 above, and the target edges may also be referred to as margin edges, or open edges in some embodiments. In this operation, the target edges which are connected end to end and form closed loops are determined based on starting points and ending points of the target edges. As a brief example, assuming that there are 6 target edges including edge 1 (A, B), edge 2 (B, C), edge 3 (C, D), edge 4 (D, A), edge 5 (E, F), and edge 6 (H, I), and that edge 1, edge 2, edge 3, and edge 4 are found to have their ending points as the starting points of adjacent edges and form a closed loop, edge 1, edge 2, edge 3, and edge 4 are the target edges which are connected end to end and form a closed loop.

Operation S1053: Determine the formed closed loops as the cross-section loops of the sub-meshes.

In this operation, the closed loops obtained in operation S1052 are determined as the cross-section loops of the sub-meshes, and if a cross-section formed by the cross-section loop is one that is displayed only when adjacent sub-meshes are separated, the cross-section will not be displayed when all the sub-meshes of the level are rendered. In some embodiments of this application, after determining the cross-section loops of the sub-meshes, rendering is completed in advance, and when the virtual object needs decomposed display, it can be directly displayed, thereby improving display efficiency.

In some embodiments, the "determining, based on the vertex information and the triangle information, target edges in the triangle grouping sets" of operation S1051 above includes the following operations:

Operation S511: Determine, based on the vertex information and the triangle information, connection edges in a $k^{th}$ triangle grouping set.

Herein, k=1, 2, . . . , M, M being a total number of the sub-meshes. In implementing this operation, the vertex indices of triangles in the $k^{th}$ triangle grouping set can be acquired, then the vertex coordinates are determined based on the vertex indices, and three connection edges of each of the triangles are determined based on the positional relationships among the vertex coordinates of each of the triangles.

For example, when the coordinates of three vertices 0, P, and Q of a triangle are $(x_o, y_o)$, $(x_p, y_p)$, and $(x_q, y_q)$, separately, and the vertices of the triangle are assumed to be connected in a clockwise direction in some embodiments, the connection relationship of the three vertices can be determined based on the coordinates of the three vertices. Assuming that the three vertices are in an order of P-O-Q in the clockwise direction, the three connection edges of the triangle are PO, OQ, and QP, separately. In this operation, the connection edges of each triangle in the triangle grouping set are determined. For example, if there are 10 triangles in the triangle grouping set, the triangle grouping set includes 30 connection edges.

Operation S512: Determine, based on the triangle information, sharing numbers of the connection edges.

In implementing this operation, the sharing number of the connection edges is first set as a first preset value. Then it is successively determined whether there is a second connection edge having the same vertices and an opposite direction to a first connection edge, and the sharing number of the first connection edge is updated to a second preset value in a case that the second connection edge having the same vertices and an opposite direction to the first connection edge exists among other connection edges than the first connection edge; the first connection edge being any of the connection edges. The sharing number of the first connection edge is kept as the first preset value in a case that the second connection edge having the same vertices and an opposite direction to the first connection edge does not exist among other connection edges than the first connection edge. For example, the first preset value may be 1, the second preset value may be 1, and the second preset value may also be 0.

That is, when a connection edge exists in only one triangle, the sharing number of the connection edge is a first preset value, and when a connection edge exists in more than one triangle, the sharing number of the connection edge is a second preset value.

Operation S513: Determine connection edges of which the sharing numbers are a first preset value as the target edges in the $k^{th}$ triangle grouping set.

Through operations S511 to S513 above, the target edges existing in only one triangle are determined per triangle grouping set, so as to determine cross-section loops of the sub-meshes corresponding to the triangle grouping sets based on the determined target edges.

As shown in FIG. 6A, in some embodiments, a rendering process may be further performed through operations S106A to S108A after operation S105, which are described below.

Operation S106A: Acquire a first target level selected for rendering a virtual object corresponding to the two-dimensional mesh data.

In implementing this operation, the first target level selected for rendering the virtual object may be preset by a technical person. For example, a second target level can be preset, and all or part of the sub-meshes of the second target level may be preset for rendering. When part of the sub-meshes of the second target level are rendered, sub-mesh identifiers of the sub-meshes to be rendered are also set.

It is also possible to determine the first target level selected for rendering the virtual object based on actual virtual scene requirements. For example, when it is determined that the whole virtual object needs to be rendered based on the actual virtual scene requirements, the first target level is determined to be the first level, and when it is determined that three-quarters of the virtual object needs to be rendered based on the actual virtual scene requirements, the first target level can be determined to be the second level.

Operation S107A: Acquire at least one target sub-mesh to be rendered in the first target level.

If the first target level is preset by a technical person, the sub-meshes to be rendered of the first target level will be preset at the same time, and the identifier of the at least one target sub-mesh to be rendered can be acquired by directly acquiring the setting information. If the first target level is determined based on the actual virtual scene requirements, a level to be selected as the first target level is determined based on whether all or part of the virtual object needs to be rendered as well as the size of the part to be rendered in implementation. That is, the part to be rendered has been determined in determining the first target level, so the identifiers corresponding to the sub-meshes to be rendered can also be determined. As an example, when it is determined that ¾ of the virtual object needs to be rendered and the sub-mesh 2 does not need to be rendered, the sub-meshes need to be rendered are three sub-meshes 1, 3, and 4. As another example, when it is determined that ¹³⁄₁₆ of the virtual object needs to be rendered, the first target level is determined to be the third level, and if three sub-meshes 8, 9, and 10 do not need be rendered, the other 13 sub-meshes can be determined to be rendered.

Operation S108A: Render the at least one target sub-mesh to obtain a first rendering result.

In this operation, the first rendering result is obtained through rendering based on a plurality of triangles in the at least one target sub-mesh.

Since the hierarchical sub-mesh structure has been constructed and triangle grouping has been performed on sub-meshes of each level in the foregoing operations, it is possible to directly determine the corresponding level and the sub-meshes to be rendered based on the size of the part to be rendered by operations S106A to S108A above when part of the virtual object needs to be rendered, thereby improving rendering efficiency.

As shown in FIG. 6B, in some embodiments, a decomposed rendering may be further performed through operations S106B to S109B after operation S105, which are described below.

Operation S106B: Determine a second target level selected for rendering the virtual object in a case that the virtual object rendered based on the two-dimensional mesh data is determined to meet a decomposition condition.

In implementation, the decomposition condition may be met when an impact is detected between the virtual object and other virtual objects, and the second target level selected for rendering the virtual object can be determined based on the impact force. For example, if the impact force is small, a small part will be decomposed from the virtual object, and a second target level of a high level is selected, such as the third level which includes 16 sub-meshes. In some embodiments, when the virtual object is determined to meet a preset explosion opportunity, the decomposition condition is determined to be met, and the second target level selected for rendering the virtual object can be determined based on the preset explosion power.

Operation S107B: Determine movement information and rotation information of sub-meshes in the second target level.

In some embodiments, the sub-meshes of each level further include preset movement information and rotation information. The movement information and the rotation information are not acquired when decomposed rendering is not required and acquired only when decomposed rendering is required for the virtual object. The movement information is used to characterize a distance between a target rendering position and a current position, and the rotation information is used to characterize a rotation angle and a rotation direction between a target rendering orientation and a current rendering orientation.

Operation S108B: Determine, based on the movement information and the rotation information of the sub-meshes, rendering positions of the sub-meshes.

In implementing this operation, initial positions and initial orientations of the sub-meshes can be acquired, and after acquiring the movement information and the rotation information of the sub-meshes, the rendering positions of the sub-meshes can be determined by using the movement information, the initial positions, the initial orientations, and the rotation information of the sub-meshes.

Operation S109B: Render, based on the rendering positions, the sub-meshes to obtain a second rendering result.

Figures 6C, 6D:
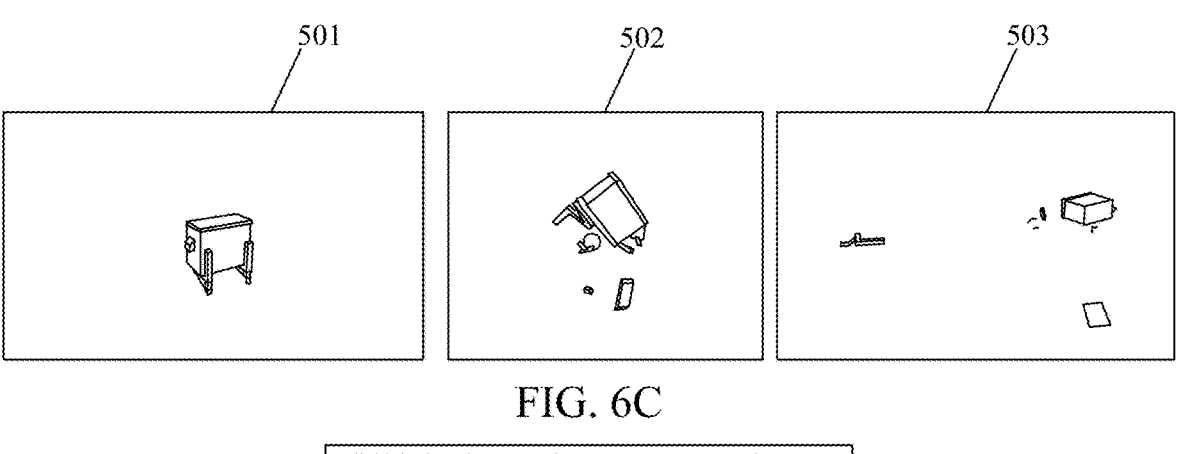
FIG. 6C is an application diagram of decomposed rendering according to some embodiments.
FIG. 6D is another flow diagram of a data processing method according to some embodiments.

The movement information may be the same or different among different sub-meshes, and the rotation information may be the same or different among different sub-meshes. When the movement information and the rotation information of two or more sub-meshes is the same, it is indicated that the two or more sub-meshes are rendered as a whole. The 16 sub-meshes of the third level are illustrated as an example. Assuming that the rendering positions of the sub-meshes 8, 9, 10, and 15 are different from those of other sub-meshes in decomposed rendering, the other 12 sub-meshes than the sub-meshes 8, 9, 10, and 15 are rendered as a whole, and the sub-meshes are rendered based on the rendering positions of the sub-meshes to obtain the second rendering result. In FIG. 6C, 501 is a virtual object rendered based on the original mesh, 502 is a virtual object rendered during the process of crushing, and 503 is a virtual object rendered with decomposition after the crushing is completed.

Through operations S106B to S109B above, the second target level for rendering can be determined based on the pre-constructed hierarchical sub-mesh structure when the virtual object meets the decomposition condition, and the rendering positions of the sub-meshes can be determined based on the movement information and the rotation information of the sub-meshes of the second target level, so that the rendering can be performed, and the decomposed rendering of the virtual object can be implemented efficiently. In addition, the cross-sections of the sub-meshes have been rendered in advance in operation S105, so that display may be performed directly without decomposition calculation and rendering when the virtual object needs decomposed display, thereby improving rendering efficiency.

In the following, exemplary application of embodiments of this application will be described in a practical application scenario.

The data processing method provided in some embodiments can be applied to a game scene or a virtual reality scene, and the application to a game scene is described as an example herein. When a virtual object that may produce explosion or decomposition (e.g., a time bomb) is included in the game scene, the virtual object rendered based on the three-dimensional mesh of the virtual object is shown in 501 in FIG. 6C. With the data processing method provided in some embodiments, dimension reduction is first performed on the three-dimensional mesh data of the virtual object to obtain two-dimensional mesh data. A hierarchical sub-mesh structure is then constructed based on the two-dimensional mesh data, and then triangles in the two-dimensional mesh data are grouped to obtain triangle grouping sets corresponding to the sub-meshes. Finally, cross-section loops of the sub-meshes are determined, and cross-sections of the sub-meshes are rendered based on the cross-section loops of the sub-meshes. In rendering the virtual object shown in 501 in FIG. 6C, a second target level for rendering is determined based on the explosion power of the virtual object and the pre-constructed hierarchical sub-mesh structure, and rendering positions during the explosion and rendering positions after the explosion of the sub-meshes are determined based on movement information and rotation information of the sub-meshes of the second target level, and then the virtual object shown in 502 in FIG. 6C is rendered based on the rendering positions during the explosion and the virtual object shown in 503 in FIG. 6C is rendered based on the rendering positions after the explosion. Since the cross-sections produced by the explosion decomposition have been rendered in advance, the decomposed rendering of the virtual object can be implemented efficiently.

The data processing method provided in some embodiments first converts a three-dimensional mesh into a two-dimensional mesh by a conformal map algorithm. The two-dimensional meshes are then grouped in a spatial hierarchical data structure which may be a quad tree, a K-D tree, etc., and finally the triangle vertex indices of the same group are stored in the same node. In addition, the method may further support sub-grouping.

FIG. 6D is another implementation flow diagram of a method for representing a three-dimensional hierarchical mesh data structure according to some embodiments, and the implementation of the method is described below in conjunction with FIG. 6D.

Operation S601: Reduce a three-dimensional mesh to a two-dimensional mesh.

Operation S602: Determine centers of triangles in the two-dimensional mesh.

Operation S603: Construct a sub-mesh hierarchy.

Operation S604: Perform triangle grouping on the two-dimensional mesh.

Operation S605: Determine cross-section loops.

The implementation of each operation is described below in conjunction with the drawings.

Figure 7:
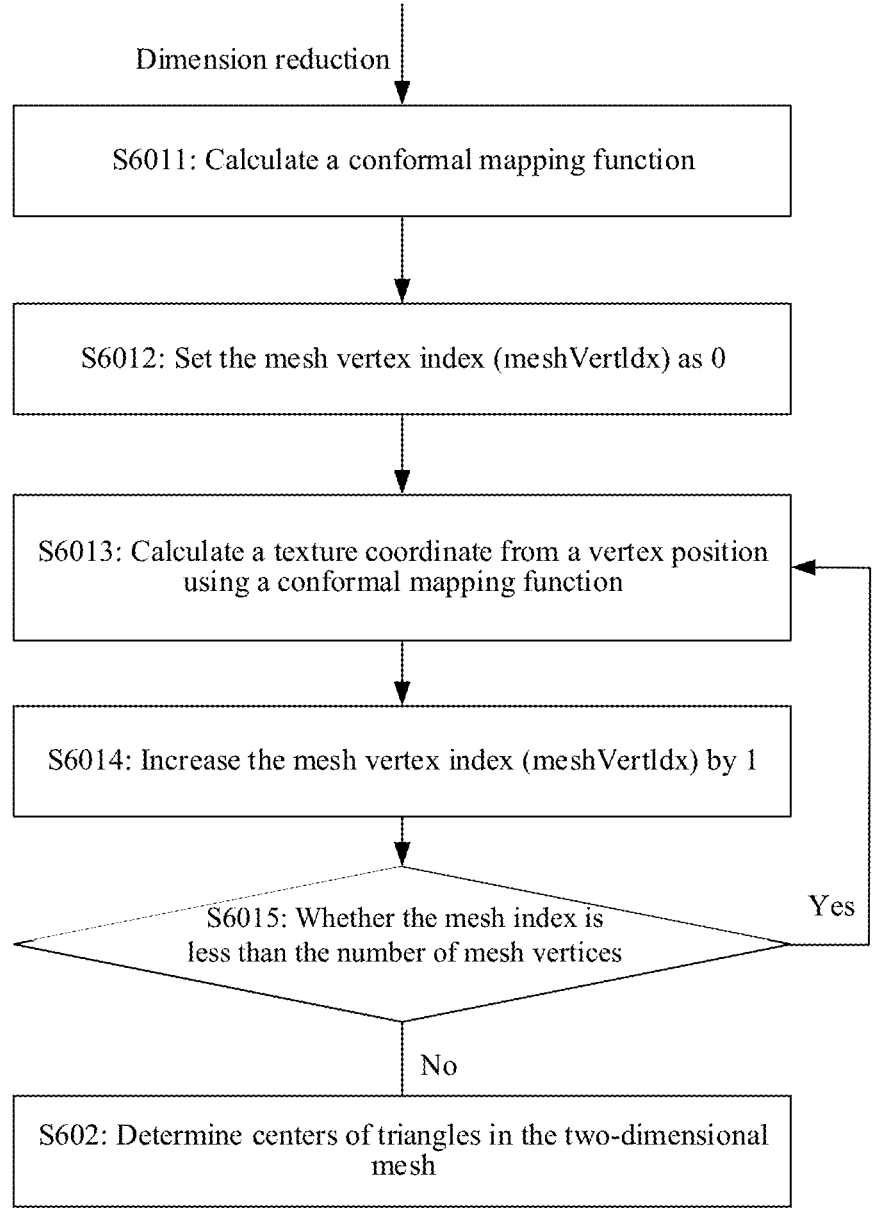
FIG. 7 is an implementation flow diagram of dimension reduction according to some embodiments.

FIG. 7 is an implementation flow diagram of dimension reduction according to some embodiments. As shown in FIG. 7, the three-dimensional mesh can be reduced to the two-dimensional mesh through the following operations:

Operation S6011: Determine a conformal mapping function.

In some embodiments, the conformal mapping function may be denoted as ConformMap( ) which is a function that converts a 3D vector into a 2D texture coordinate uv. For each mesh vertex, a corresponding two-dimensional texture coordinate can be determined by the conformal mapping function.

Operation S6012: Set the mesh vertex index (meshVertIdx) as 0.

Operation S6013: Calculate the texture coordinate from the vertex position using the conformal mapping function.

In implementation, the vertex texture coordinate may be calculated using the formula (1-1):

$$\text{mesh.uv[meshVertIdx]=ConformMap(Meshvert[meshVertIDx])} \qquad (1\text{-}1).$$

Operation S6014: Increase the mesh vertex index by 1.

Operation S6015: Determine whether the mesh vertex index is less than the number of mesh vertices.

If the mesh vertex index is less than the number of mesh vertices, the process proceeds to operation S6012; and if the mesh vertex index is not less than the number of mesh vertices, which indicates that the dimension reduction has been completed, the process proceeds to operation S602 for triangle center calculation.

After dimension reduction is performed on the vertices in the mesh and the vertex indices are determined, center coordinates of the triangles in the mesh can be determined through operations shown in FIG. 8, and the implementation of determining triangle centers will be described below in conjunction with FIG. 8.

Operation S6021: Set the triangle index (triangleIDx) as 0.

Operation S6022: Acquire an index and a vertex position of a first vertex of a (triangleIDx)$^{th}$ triangle.

$$\text{i0=triangles[triangleIdx].indices[0], and} \\ \text{v0=mesh.vert[i0].}$$

Operation S6023: Acquire an index and a vertex position of a second vertex of the (triangleIDx)$^{th}$ triangle.

$$\text{i1=triangles[triangleIdx].indices[1], and} \\ \text{v1=mesh.vert[i1].}$$

Operation S6024: Acquire an index and a vertex position of a third vertex of the (triangleIDx)$^{th}$ triangle.

$$i2=triangles[triangleIdx].indices[2], \text{ and}$$
$$v2=mesh.vert[i2].$$

Operation S6025: Calculate the triangle center.

The triangle center can be calculated according to triangle_center[TriangleIdx]=(v0+v1+v2)/3.

Operation S6026: Increase the triangle index (triangleIDx) by 1.

Operation S6027: Determine whether the triangle index is less than the number of mesh triangles.

If the triangle index is less than the number of mesh triangles, which indicates that there is a mesh triangle in which the triangle center is not calculated, the process proceeds to operation S6022; and if the triangle index is not less than the number of mesh triangles, which indicates that the calculation of all triangle centers in the mesh has been completed, the process proceeds to operation S603.

FIG. 9A is an implementation flow diagram for constructing a sub-mesh hierarchy according to some embodiments, and the implementation for constructing the sub-mesh hierarchy is described below in conjunction with operations of FIG. 9A.

Operation S6031: Acquire a maximum sub-mesh level and an initial value of a root sub-mesh ID and initial values of vertex coordinates of a root sub-mesh.

In some embodiments, the maximum sub-mesh level is exemplified as 4, the initial value of the root sub-mesh ID as 0, the initial value of the coordinate of the lower left vertex of the root sub-mesh as (0, 0), and the initial value of the coordinate of the upper right vertex as (1, 1).

Operation S6032: Call a sub-mesh hierarchy construction function to complete the sub-mesh hierarchy construction.

The sub-mesh hierarchy construction function can be SubMesh (SubMeshLevel, SubMeshID, lowerLeft, upperRight), and in implementing operation S6032, the sub-mesh hierarchy construction can be completed through rootMesh=SubMesh (maxSubMeshLevel, rootSubMeshID, rootSubMeshLowerLeft, rootSubMeshUpperRight), where maxSubMeshLevel is the maximum sub-mesh level, rootSubMeshID is the root sub-mesh ID, rootSubMeshLowerLeft is the coordinate of the lower left vertex of the root sub-mesh, and rootSubMeshUpperRight is the coordinate of the upper right vertex of the root sub-mesh.

Figure 9B:
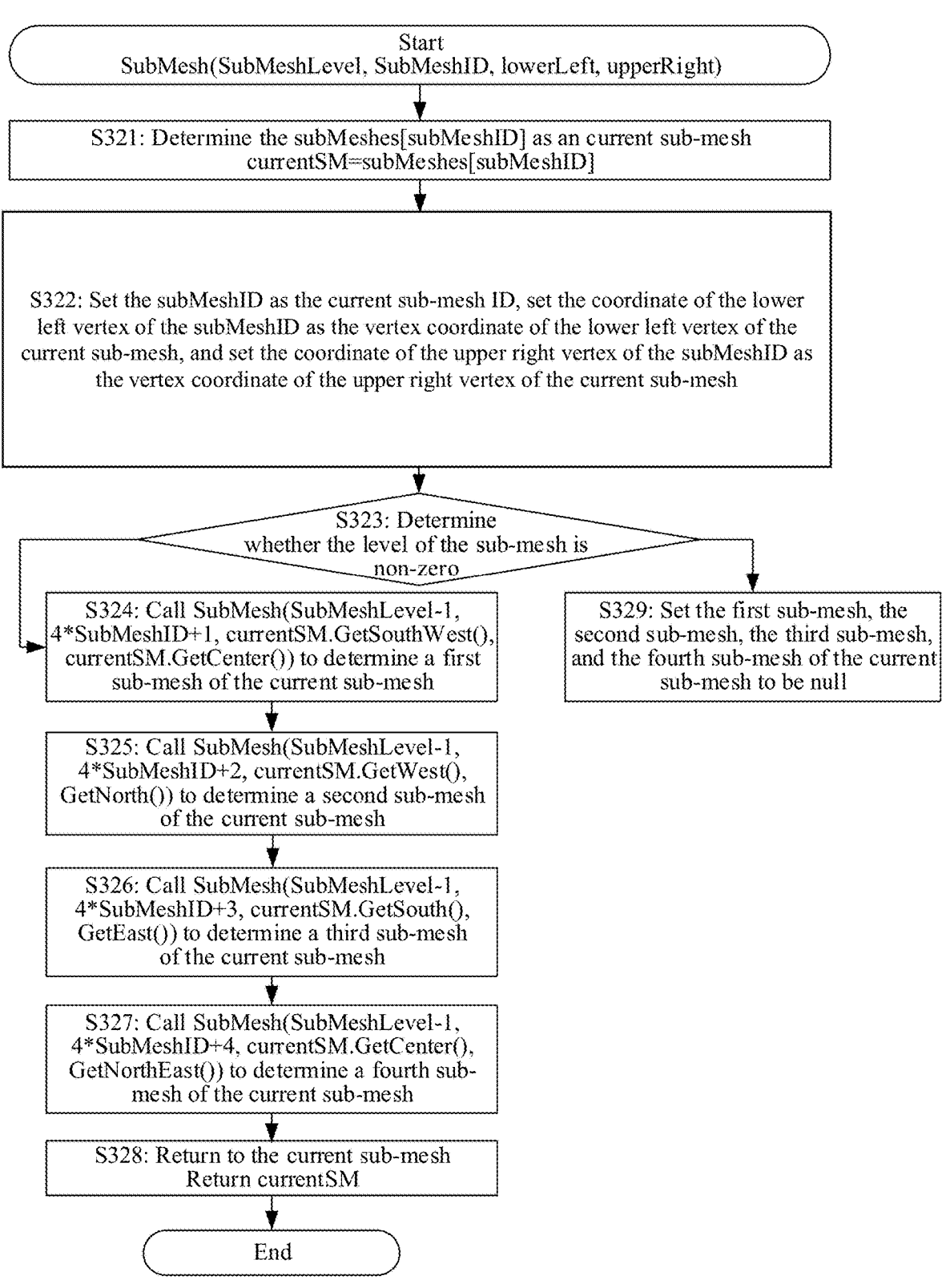
FIG. 9B is an implementation logic diagram of a sub-mesh hierarchy construction function according to some embodiments.

FIG. 9B is an implementation logic diagram of a sub-mesh hierarchy construction function according to some embodiments, and the implementation logic of the function is described below in conjunction with FIG. 9B.

Operation S321: Determine subMeshes[subMeshID] as a current sub-mesh.

That is, currentSM=subMeshes[subMeshID].

Operation S322: Set subMeshID as an current sub-mesh ID, set a coordinate of a lower left vertex of the subMeshID as a vertex coordinate of a lower left vertex of the current sub-mesh, and set a coordinate of an upper right vertex of the subMeshID as a vertex coordinate of an upper right vertex of the current sub-mesh.

That is, currentSM.subMeshID=rootsubMeshID, currentSM.lowerLeft=rootSubMeshLowerLeft, and currentSM.upperRight=rootSubMeshUpperRight.

Operation S323: Determine whether the level of the sub-mesh is non-zero.

When the level of the sub-mesh is non-0, the process proceeds to operation S324; and when the level of the sub-mesh is 0, the process proceeds to operation S329.

Operation S324: Call SubMesh(SubMeshLevel−1, 4*SubMeshID+1, currentSM.GetSouthWest( ), currentSM.GetCenter( )) to determine a first sub-mesh of the current sub-mesh.

GetSouthWest( ) is a function for acquiring the southwest coordinate of the current sub-mesh, and the function returns a position coordinate (lowerLeft.x, lowerLeft.y); and GetCenter( ) is a function for acquiring the center coordinate of the current sub-mesh, and the function returns a position coordinate ((lowerLeft.x+upperRight.x)*0.5, (lowerLeft.y+upperRight.y)*0.5). The first sub-mesh ID of the current sub-mesh is 4*current sub-mesh ID+1, the coordinate of the lower left vertex of the first sub-mesh of the current sub-mesh is the southwest coordinate of the current sub-mesh, and the coordinate of the upper right vertex of the first sub-mesh of the current sub-mesh is the center coordinate of the current sub-mesh.

Operation S325: Call SubMesh(SubMeshLevel−1, 4*SubMeshID+2, currentSM.GetWest( ), GetNorth( ) to determine a second sub-mesh of the current sub-mesh.

GetWest( ) is a function for acquiring the west coordinate of the current sub-mesh, and the function returns a position coordinate (lowerLeft.x, (lowerLeft.y+upperRight.y)*0.5); and GetNorth( ) is a function for acquiring the north coordinate of the current sub-mesh, and the function returns a position coordinate ((lowerLeft.x+upperRight.x)*0.5, upperRight.y). The second sub-mesh ID of the current sub-mesh is 4*current sub-mesh ID+2, the coordinate of the lower left vertex of the second sub-mesh of the current sub-mesh is the west coordinate of the current sub-mesh, and the coordinate of the upper right vertex of the second sub-mesh of the current sub-mesh is the north coordinate of the current sub-mesh.

Operation S326: Call SubMesh(SubMeshLevel−1, 4*SubMeshID+3, currentSM.GetSouth( ), GetEast( ) to determine a third sub-mesh of the current sub-mesh.

GetSouth( ) is a function for acquiring the south coordinate of the current sub-mesh, and the function returns a position coordinate ((lowerLeft.x+upperRight.x)*0.5, lowerLeft.y); and GetEast( ) is a function for acquiring the west coordinate of the current sub-mesh, and the function returns a position coordinate (lowerLeft.x, (lowerLeft.y+upperRight.y)*0.5). The third sub-mesh ID of the current sub-mesh is 4*current sub-mesh ID+3, the coordinate of the lower left vertex of the third sub-mesh of the current sub-mesh is the south coordinate of the current sub-mesh, and the coordinate of the upper right vertex of the third sub-mesh of the current sub-mesh is the west coordinate of the current sub-mesh.

Operation S327: Call SubMesh(SubMeshLevel−1, 4*SubMeshID+4, currentSM.GetCenter( ), GetNorthEast( ) to determine a fourth sub-mesh of the current sub-mesh.

GetNorthEast( ) is a function for acquiring the northeast coordinate of the current sub-mesh, and the function returns a position coordinate (upperRight.x, upperRight.y). The fourth sub-mesh ID of the current sub-mesh is 4*current sub-mesh ID+4, the coordinate of the lower left vertex of the fourth sub-mesh of the current sub-mesh is the center coordinate of the current sub-mesh, and the coordinate of the upper right vertex of the fourth sub-mesh of the current sub-mesh is the northeast coordinate of the current sub-mesh.

Operation S328: Return to the current sub-mesh.

Operation S329: Set the first sub-mesh, the second sub-mesh, the third sub-mesh, and the fourth sub-mesh of the current sub-mesh to be null.

Figures 9C, 10A:
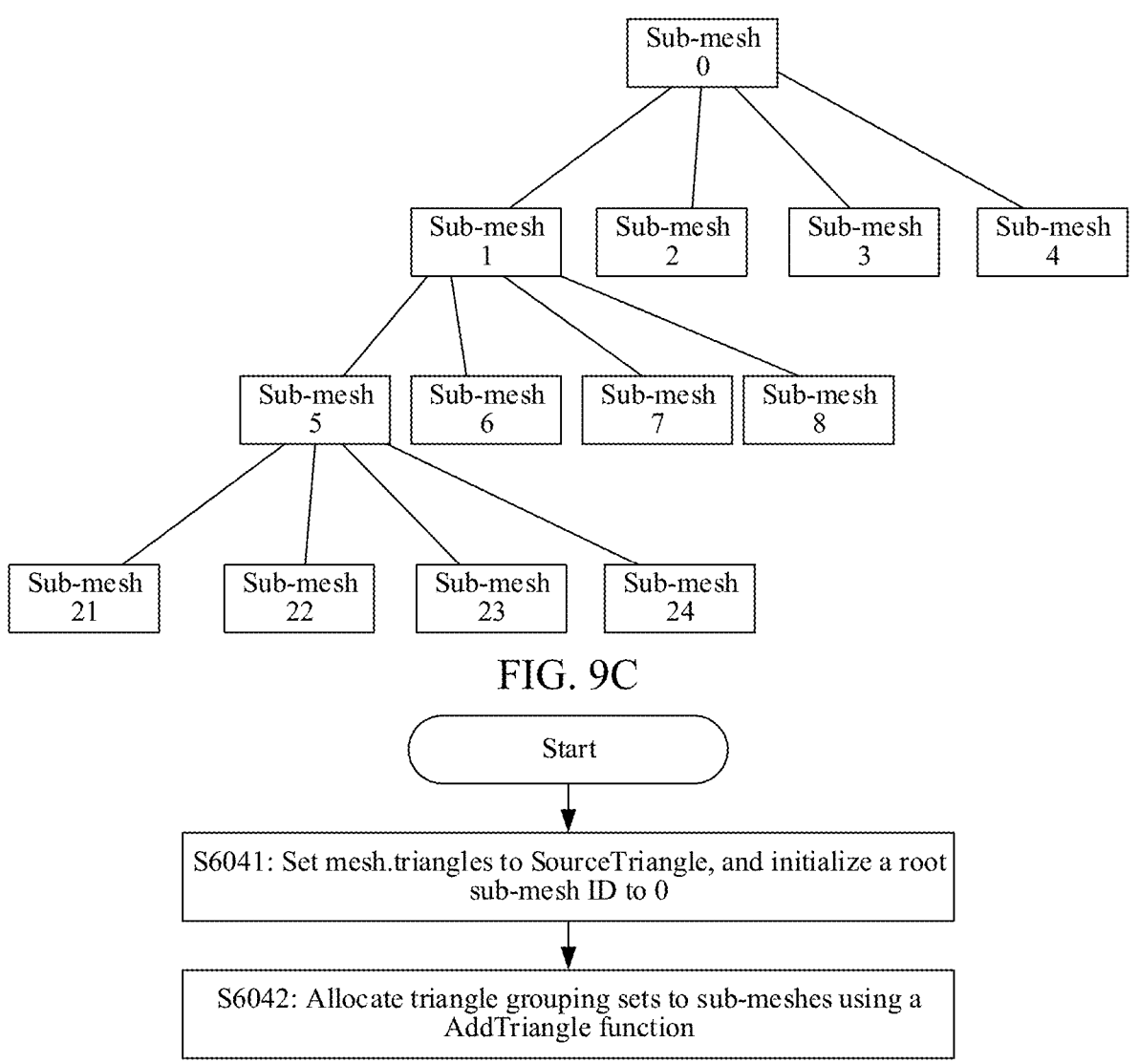
FIG. 9C is a schematic diagram of a hierarchical sub-mesh structure according to some embodiments.
FIG. 10A is an implementation flow diagram of triangle grouping on a two-dimensional mesh according to some embodiments.

FIG. 9C is a schematic diagram of a hierarchical sub-mesh structure according to some embodiments. As shown in FIG. 9C, each sub-mesh has its sub-meshes, where the root sub-mesh is the sub-mesh 0, the sub-mesh 0 is divided into a sub-mesh 1, a sub-mesh 2, a sub-mesh 3, and a sub-mesh 4, the sub-mesh 1 is further divided into a sub-mesh 5, a sub-mesh 6, a sub-mesh 7, and a sub-mesh 8, and the sub-mesh 5 is further divided into a sub-mesh 21, a sub-mesh 22, a sub-mesh 23, and a sub-mesh 24. In practice, the sub-mesh 2, the sub-mesh 3, and the sub-mesh 4, and the sub-mesh 6, the sub-mesh 7, and the sub-mesh 8 will be further divided into sub-meshes, which is not shown in FIG. 9C.

FIG. 10A is an implementation flow diagram of triangle grouping on a two-dimensional mesh according to some embodiments. The implementation for triangle grouping on the two-dimensional mesh is described below in conjunction with FIG. 10A.

Operation S6041: Set mesh.triangles to SourceTriangle, and initialize the root sub-mesh ID to 0.

Operation S6042: Allocate triangle grouping sets to the sub-meshes using the AddTriangle function.

The AddTriangle function can be AddTriangle(sub-MeshID, triangles), and in implementing operation S6042, rootSubMeshID and SourceTriangle can be used as function parameters to complete triangle grouping.

Figure 10B:
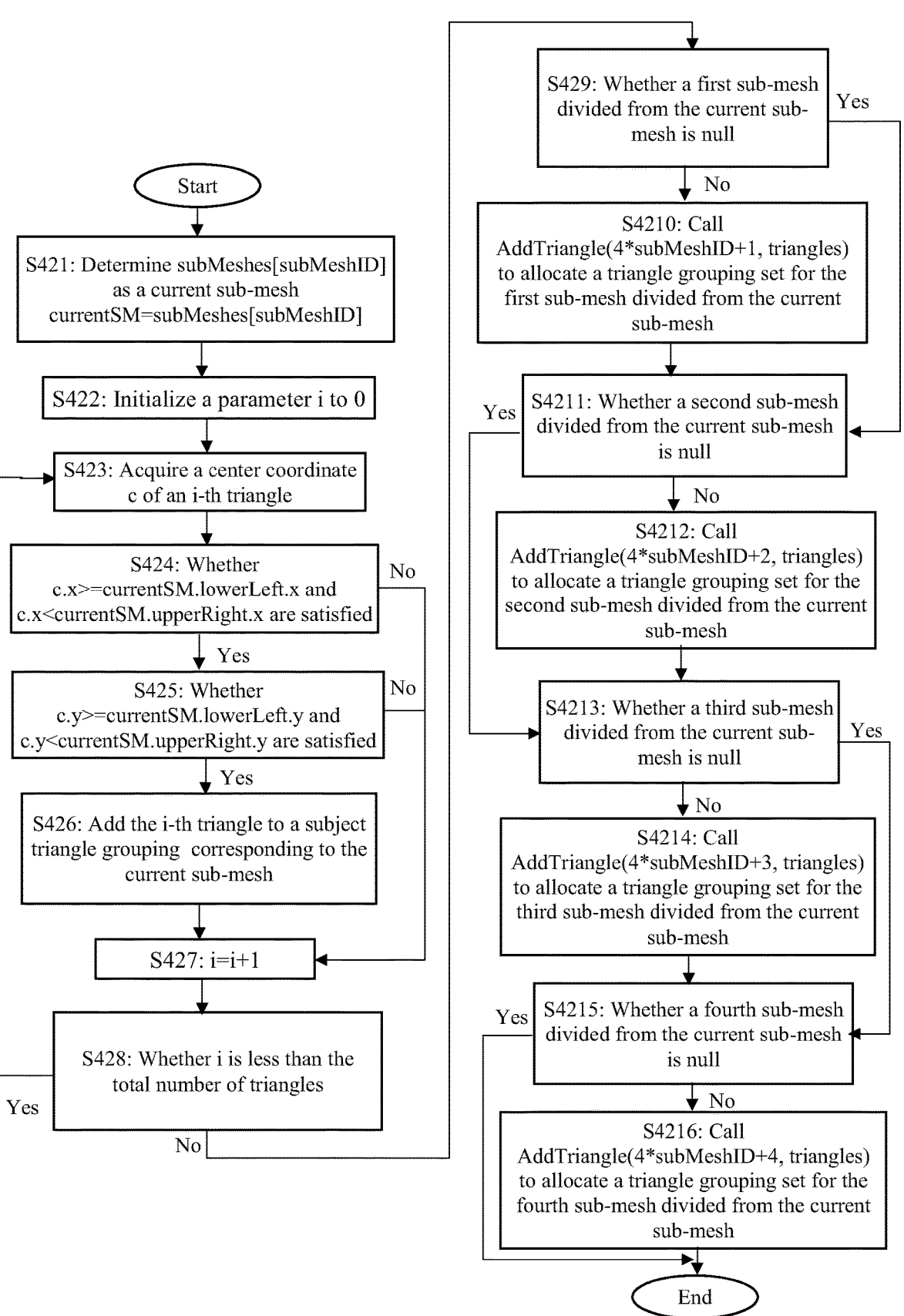
FIG. 10B is an implementation logic diagram of the AddTriangle function according to some embodiments.

FIG. 10B is an implementation logic diagram of the AddTriangle function according to some embodiments. The implementation logic of the AddTriangle function is described below in conjunction with FIG. 10B.

Operation S421: Determine subMeshes[subMeshID] as the current sub-mesh.

That is, currentSM=subMeshes[subMeshID].

Operation S422: Initialize the parameter i to 0.

Operation S423: Acquire a center coordinate c of an $i^{th}$ triangle.

Operation S424: Determine whether c.x>=currentSM.lowerLeft.x and c.x<currentSM.upperRight.x are satisfied.

If c.x>=currentSM.lowerLeft.x and c.x<currentSM.upperRight.x are satisfied, which indicates that the x coordinate of the center coordinate of the $i^{th}$ triangle is within the x coordinate range of the current sub-mesh, the process proceeds to operation S425; and if c.x>=currentSM.lowerLeft.x and c.x<currentSM.upperRight.x are not satisfied, the process proceeds to operation S427.

Operation S425: Determine whether c.y>=currentSM.lowerLeft.y and c.y<currentSM.upperRight.y are satisfied.

If c.y>=currentSM.lowerLeft.y and c.y<currentSM.upperRight.y are satisfied, the process proceeds to operation S426; and if c.y>=currentSM.lowerLeft.y and c.y<currentSM.upperRight.y are not satisfied, the process proceeds to operation S427.

Operation S426: Add the $i^{th}$ triangle to the triangle grouping set corresponding to the current sub-mesh.

Operation S427: Accumulate the value of i by 1, i.e., i=i+1.

Operation S428: Determine whether i is less than the total number of the triangles.

When i is less than the total number of the triangles, the process proceeds to operation S423; and when i is not less than the total number of the triangles, which indicates that grouping is completed for the current sub-mesh, the process proceeds to operation S429.

Operation S429: Determine whether the first sub-mesh divided from the current sub-mesh is null.

If the first sub-mesh divided from the current sub-mesh is not null, the process proceeds to operation S4210; and if the first sub-mesh divided from the current sub-mesh is null, the process proceeds to operation S4211.

Operation S4210: Call AddTriangle(4*subMeshID+1, triangles) to allocate a triangle grouping set for the first sub-mesh divided from the current sub-mesh.

Operation S4211: Determine whether the second sub-mesh divided from the current sub-mesh is null.

If the second sub-mesh divided from the current sub-mesh is not null, the process proceeds to operation S4212; and if the second sub-mesh divided from the current sub-mesh is null, the process proceeds to operation S4213.

Operation S4212: Call AddTriangle(4*subMeshID+2, triangles) to allocate a triangle grouping set for the second sub-mesh divided from the current sub-mesh.

Operation S4213: Determine whether the third sub-mesh divided from the current sub-mesh is null.

If the third sub-mesh divided from the current sub-mesh is not null, the process proceeds to operation S4214; and if the third sub-mesh divided from the current sub-mesh is null, the process proceeds to operation S4215.

Operation S4214: Call AddTriangle(4*subMeshID+3, triangles) to allocate a triangle grouping set for the third sub-mesh divided from the current sub-mesh.

Operation S4215: Determine whether the fourth sub-mesh divided from the current sub-mesh is null.

If the fourth sub-mesh divided from the current sub-mesh is not null, the process proceeds to operation S4216; and if the fourth sub-mesh divided from the current sub-mesh is null, the process proceeds to operation S605.

Operation S4216: Call AddTriangle(4*subMeshID+4, triangles) to allocate a triangle grouping set for the fourth sub-mesh divided from the current sub-mesh.

Through operations S421 to S4216 above, all triangles of the mesh (mesh.triangles) are put into the function Adds Triangle for processing, and the function checks whether the triangle centers are within the rectangular region of the sub-mesh. If a triangle is within the rectangular region where the sub-mesh is positioned, the triangle is added to the triangle grouping set of the sub-mesh, and after all the triangles are processed, it is further determined whether the triangles are within the sub-mesh divided from the current sub-mesh, and the recursive process is continued until there is no sub-mesh.

Figure 11A:
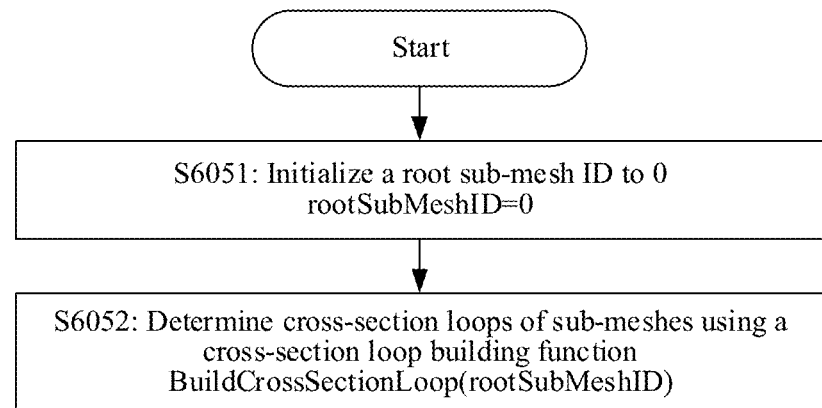
FIG. 11A is an implementation flow diagram of calculating cross-section loops according to some embodiments.

FIG. 11A is an implementation flow diagram of calculating cross-section loops according to some embodiments. The implementation of calculating cross-section loops is described below in conjunction with FIG. 11A.

Operation S6051: Initialize the root sub-mesh ID to 0.

Operation S6052: Determine cross-section loops of the sub-meshes using a cross-section loop building function.

The cross-section loop building function can be Build-CrossSectionLoop(subMeshID), and in implementing operation S6052, the root sub-mesh ID may be determined as a parameter of the cross-section loop building function, and the cross-section loops of the sub-meshes can be determined by recursively calling the function.

Figure 11B:
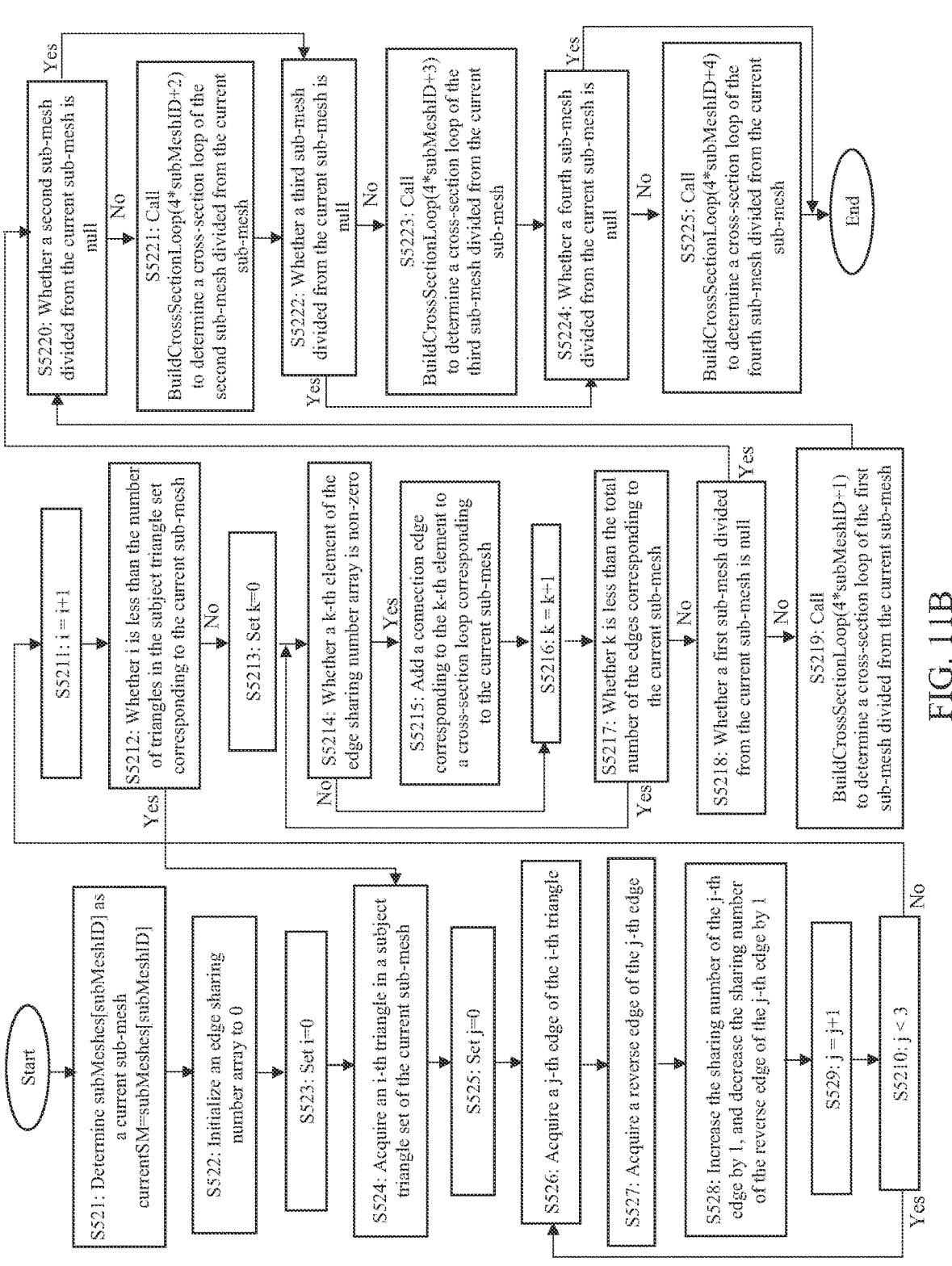
FIG. 11B is an implementation logic diagram of a cross-section loop building function according to some embodiments.

FIG. 11B is an implementation logic diagram of a cross-section loop building function according to some embodiments. The implementation logic is described below in conjunction with FIG. 11B.

Operation S521: Determine subMeshes[subMeshID] as the current sub-mesh.

That is, currentSM=subMeshes[subMeshID], and sub-MeshID is the root sub-mesh ID when the function is called.

Operation S522: Initialize the edge sharing number array to 0.

Operation S523: Set i=0.

Operation S524: Acquire the $i^{th}$ triangle in the triangle grouping set of the current sub-mesh.

Operation S525: Set j=0.

Operation S526: Acquire a $j^{th}$ edge of the $i^{th}$ triangle.

Operation S527: Acquire a reverse edge of the $j^{th}$ edge.

Operation S528: Increase the sharing number of the $i^{th}$ edge by 1, and decrease the sharing number of the reverse edge of the $j^{th}$ edge by 1.

Operation S529: Accumulate the value of j by 1, i.e., j=j+1.

Operation S5210: Determine whether j is less than 3.

If j is less than 3, the process proceeds to operation S526; and if j is not less than 3, the process proceeds to operation S5211.

Operation S5211: Accumulate the value of i by 1, i.e., i=i+1.

Operation S5212: Determine whether i is less than the number of triangles in the triangle grouping set corresponding to the current sub-mesh.

If i is less than the number of triangles in the triangle grouping set corresponding to the current sub-mesh, the process proceeds to operation S524; and if i is not less than the number of triangles in the triangle grouping set corresponding to the current sub-mesh, the process proceeds to operation S5213.

Operation S5213: Set k=0.

Operation S5214: Determine whether a $k^{th}$ element of the edge sharing number array is non-zero.

When the $k^{th}$ element is non-0, the process proceeds to operation S5215; and when the $k^{th}$ element is 0, the process proceeds to operation S5216.

Operation S5215: Add a connection edge corresponding to the $k^{th}$ element to the cross-section loop corresponding to the current sub-mesh.

Operation S5216: Accumulate the value of k by 1, i.e., k=k+1.

Operation S5217: Determine whether k is less than the total number of the edges corresponding to the current sub-mesh.

If k is less than the total number of the edges corresponding to the current sub-mesh, the process proceeds to operation S5214; and if k is not less than the total number of the edges corresponding to the current sub-mesh, the process proceeds to operation S5218.

Operation S5218: Determine whether the first sub-mesh divided from the current sub-mesh is null.

When the first sub-mesh divided from the current sub-mesh is not null, the process proceeds to operation S5219; and when the first sub-mesh divided from the current sub-mesh is null, the process proceeds to operation S5220.

Operation S5219: Call BuildCrossSectionLoop(4*sub-MeshID+1) to determine a cross-section loop of the first sub-mesh divided from the current sub-mesh.

Operation S5220: Determine whether the second sub-mesh divided from the current sub-mesh is null.

When the second sub-mesh divided from the current sub-mesh is not null, the process proceeds to operation S5221; and when the second sub-mesh divided from the current sub-mesh is null, the process proceeds to operation S5222.

Operation S5221: Call BuildCrossSectionLoop(4*sub-MeshID+2) to determine a cross-section loop of the second sub-mesh divided from the current sub-mesh.

Operation S5222: Determine whether the third sub-mesh divided from the current sub-mesh is null.

When the third sub-mesh divided from the current sub-mesh is not null, the process proceeds to operation S5223; and when the second sub-mesh divided from the current sub-mesh is null, the process proceeds to operation S5224.

Operation S5223: Call BuildCrossSectionLoop(4*sub-MeshID+3) to determine a cross-section loop of the third sub-mesh divided from the current sub-mesh.

Operation S5224: Determine whether the fourth sub-mesh divided from the current sub-mesh is null.

When the fourth sub-mesh divided from the current sub-mesh is not null, the process proceeds to operation S5225; and when the fourth sub-mesh divided from the current sub-mesh is null, the flow ends.

Operation S5225: Call BuildCrossSectionLoop(4*sub-MeshID+4) to determine a cross-section loop of the fourth sub-mesh divided from the current sub-mesh.

The data processing method provided in some embodiments can handle a grouping problem in a low dimension (two-dimension) by dimension reduction of three-dimensional mesh data to two-dimensional mesh data, without handling the grouping problem using an octree in a high dimension (three-dimension), thereby reducing the computational complexity. After dimension reduction, the coordinates of triangles are calculated in the two-dimensional mesh data, and a hierarchical sub-mesh structure is constructed. Then, triangle grouping sets are allocated to the sub-meshes, so that the effect of multiple "multi-level explosion" can be supported, and the cross-section loops of the sub-meshes are determined and cached, thereby improving rendering efficiency and realizing real-time rendering.

Next, an exemplary structure of the data processing apparatus 443 implemented as a software module provided in some embodiments is described below. As shown in FIG. 3, in some embodiments, the software module stored in the data processing apparatus 443 of the memory 440 may include the following modules.

A dimension reduction module 4431 is configured to acquire three-dimensional mesh data to be processed, and perform dimension reduction on the three-dimensional mesh data to obtain two-dimensional mesh data, the two-dimensional mesh data including vertex information and triangle information.

A hierarchical construction module 4432 is configured to construct, based on the two-dimensional mesh data, a hierarchical sub-mesh structure, each level of the sub-mesh structure including at least one sub-mesh.

A triangle grouping module 4433 is configured to perform, based on the sub-meshes, triangle grouping on the two-dimensional mesh data to obtain triangle grouping sets corresponding to the sub-meshes.

A hierarchical storage module 4434 is configured to hierarchically store, based on the levels of the sub-meshes, the sub-meshes and the triangle grouping sets corresponding to the sub-meshes.

A first determination module 4435 is configured to determine, based on the vertex information and the triangle information, cross-section loops of the sub-meshes, and render, based on the cross-section loops of the sub-meshes, cross-sections of the sub-meshes.

In some embodiments, the dimension reduction module 4431 is further configured to:

acquire a preset conformal mapping function;

acquire three-dimensional coordinate information of vertices from the three-dimensional mesh data; and perform conformal mapping on the three-dimensional coordinate information of the vertices using the conformal mapping function to obtain two-dimensional coordinate information of the vertices.

In some embodiments, the hierarchical construction module 4432 is further configured to:

determine a mesh corresponding to the two-dimensional mesh data as a first-level sub-mesh;

acquire vertex coordinates and center coordinates of $i^{th}$ target regions corresponding to $i^{th}$-level sub-meshes, $i=1, 2, \ldots, (N-1)$, N being a preset level number, and N being an integer greater than 1; and divide, based on the vertex coordinates and the center coordinates of the $i^{th}$ target regions, the $i^{th}$-level sub-meshes to obtain a plurality of $(i+1)^{th}$-level sub-meshes.

In some embodiments, the triangle grouping module 4433 is further configured to:

determine, based on the vertex information and the triangle information, center coordinates of triangles;

acquire, based on region information of the sub-meshes, vertex coordinates of a $j^{th}$ sub-mesh, $j=1, 2, \ldots, M, M$ being a total number of the sub-meshes, and M being a positive integer; and allocate, based on the center coordinates of the triangles and the vertex coordinates of the $j^{th}$ sub-mesh, triangles with center coordinates positioned in the target region corresponding to the $j^{th}$ sub-mesh to the triangle grouping set corresponding to the $j^{th}$ sub-mesh.

In some embodiments, the triangle grouping module 4433 is further configured to:

determine, based on the vertex information and the triangle information, three vertex coordinates of each triangle, the vertex coordinates each including a first vertex coordinate value and a second vertex coordinate value;

determine, based on three first vertex coordinate values of each of the triangles, first center coordinate values of the triangles; and determine, based on three second vertex coordinate values of each of the triangles, second center coordinate values of the triangles.

In some embodiments, the first determination module 4435 is further configured to:

determine, based on the vertex information and the triangle information, target edges in the triangle grouping sets, the target edges being edges existing in only one triangle;

determine target edges which are connected end to end and form closed loops from a plurality of target edges in the triangle grouping sets; and determine the formed closed loops as the cross-section loops of the sub-meshes.

In some embodiments, the first determination module 4435 is further configured to:

determine, based on the vertex information and the triangle information, connection edges in a $k^{th}$ triangle grouping set, $k=1, 2, \ldots, M, M$ being a total number of the sub-meshes, and M being a positive integer;

determine, based on the triangle information, sharing numbers of the connection edges; and determine connection edges of which the sharing numbers are a first preset value as the target edges in the $k^{th}$ triangle grouping set.

In some embodiments, the first determination module 4435 is further configured to:

set the sharing numbers of the connection edges as the first preset value; and update the sharing number of a first connection edge to a second preset value in a case that a second connection edge having the same vertices and an opposite direction to the first connection edge exists among other connection edges than the first connection edge; the first connection edge being any of the connection edges.

In some embodiments, the apparatus further includes the following modules.

A first acquisition module is configured to acquire a first target level selected for rendering a virtual object corresponding to the two-dimensional mesh data.

A second acquisition module is configured to acquire at least one target sub-mesh to be rendered in the first target level.

A first rendering module is configured to render the at least one target sub-mesh to obtain a first rendering result.

In some embodiments, the apparatus further includes the following modules.

A second determination module is configured to determine a second target level selected for rendering the virtual object in a case that the virtual object rendered based on the two-dimensional mesh data is determined to reach a decomposition condition.

A third determination module is configured to determine movement information and rotation information of sub-meshes in the second target level.

A fourth determination module is configured to determine, based on the movement information and the rotation information of the sub-meshes, rendering positions of the sub-meshes.

A second rendering module is configured to render, based on the rendering positions, the sub-meshes to obtain a second rendering result.

The description of the data processing apparatus in some embodiments is similar to the description of the method in the embodiment above, and has similar beneficial effects as the embodiment of the method. Reference may be made to the description of the embodiment of the method in this application for technical details not disclosed in the embodiment of the apparatus.

A person skilled in the art would understand that the above-described "modules" could be implemented by hardware logic, a processor or processors executing computer software code, or a combination of both. The "modules" may also be implemented in software stored in a memory of a computer or a non-transitory computer-readable medium, where the instructions of each module and unit are executable by a processor to thereby cause the processor to perform the respective operations of the corresponding module.

According to some embodiments, each module, or code, in the apparatus may exist respectively or be combined into one or more units. Certain (or some) unit in the units may be further split into multiple smaller function subunits, thereby implementing the same operations without affecting the technical effects of some embodiments. The modules are divided based on logical functions. In actual applications, a function of one module may be realized by multiple units, or functions of multiple modules may be realized by one unit. In some embodiments, the apparatus may further include other units. In actual applications, these functions may also be realized cooperatively by the other units, and may be realized cooperatively by multiple units.

Some embodiments provide a computer program product or computer program including computer instructions stored in a computer-readable storage medium. A processor of a computer device reads the computer instructions from the computer-readable storage medium, and the processor executes the computer instructions to cause the computer device to perform the data processing method of the embodiment above of this application.

Some embodiments provide a computer-readable storage medium storing executable instructions that, when executed by a processor, cause the processor to perform the data processing method provided in some embodiments, such as the data processing method illustrated in FIG. 4, FIG. 5, FIG. 6A, and FIG. 6B.

In some embodiments, the computer-readable storage medium may be a memory such as a ferroelectric random access memory (FRAM), a read-only memory (ROM), a programmable read-only memory (PROM), an erasable programmable read-only memory (EPROM), an electrically erasable programmable read-only memory (EEPROM), a flash memory, a magnetic surface memory, an optical disk, or a compact disc read-only memory (CD-ROM); or any device including one or any combination of the memories above.

In some embodiments, the executable instructions may be written in any form of program, software, software module, script, or code, in any form of programming language, including compiler or interpretive languages, or declarative or procedural languages, and they may be deployed in any form, including being deployed as stand-alone programs or as modules, components, subroutines, or other units suitable for use in a computing environment.

In some embodiments, the executable instructions may correspond to files in a file system, and may be stored in a part of files that hold other programs or data, e.g., in one or more scripts in a hyper text markup language (HTML) document, in a single file dedicated to the program in question, or in multiple collaborative files (e.g., files that store one or more modules, subroutines, or code portions).

In some embodiments, the executable instructions may be deployed to be executed on one computing device or on a plurality of computing devices positioned at one site, or on a plurality of computing devices distributed at a plurality of sites and interconnected through a communication network.

The foregoing embodiments are used for describing, instead of limiting the technical solutions of the disclosure. A person of ordinary skill in the art shall understand that although the disclosure has been described in detail with reference to the foregoing embodiments, modifications can be made to the technical solutions described in the foregoing embodiments, or equivalent replacements can be made to some technical features in the technical solutions, provided that such modifications or replacements do not cause the essence of corresponding technical solutions to depart from the spirit and scope of the technical solutions of the embodiments of the disclosure.

What is claimed is:

1. A data processing method, performed by a computer device, the method comprising:
   acquiring three-dimensional mesh data to be processed, and performing dimension reduction on the three-dimensional mesh data to obtain two-dimensional mesh data, the two-dimensional mesh data comprising vertex information and triangle information;

constructing, based on the two-dimensional mesh data, a hierarchical sub-mesh structure having one or more levels, each level of the hierarchical sub-mesh structure comprising at least one sub-mesh;
   performing, based on the at least one sub-mesh, grouping of triangles in the two-dimensional mesh data to obtain triangle grouping sets corresponding to the at least one sub-mesh;
   hierarchically storing, based on levels corresponding to the at least one sub-mesh, the at least one sub-mesh and the triangle grouping sets corresponding to the at least one sub-mesh;
   acquiring a first target level of the hierarchical sub-mesh structure to be rendered for a virtual object corresponding to the two-dimensional mesh data, the first target level being based on a required detail with which the virtual object is to be rendered in a scene;
   determining, based on the vertex information, the first target level, and the triangle information, cross-section loops of one or more sub-meshes in the first target level;
   based on the first target level, rendering one or more target sub-meshes and cross-sections of the one or more target sub-meshes to obtain a first rendering result rendering the virtual object corresponding to the two-dimensional mesh data corresponding to the required detail, wherein the cross-sections are based on the cross-section loops, and wherein the cross-sections of the one or more target sub-meshes are not visible when the virtual object is rendered corresponding to the first target level;
   determining a second target level of the hierarchical sub-mesh structure for rendering the virtual object in response to the virtual object corresponding to the first target level being determined to meet a decomposition condition;
   determining movement information and rotation information of the at least one sub-mesh in the second target level;
   determining, based on the movement information and the rotation information of the sub- meshes, rendering positions of the at least one sub-mesh in the second target level; and
   rendering, based on the rendering positions and previously rendered cross-sections of the one or more target sub-meshes, a second rendering result.

2. The data processing method according to claim 1, wherein the performing dimension reduction comprises:
   acquiring a preset conformal mapping function;
   acquiring three-dimensional coordinate information of vertices from the three-dimensional mesh data; and
   performing conformal mapping on the three-dimensional coordinate information of the vertices using the preset conformal mapping function to obtain two-dimensional coordinate information of the vertices.

3. The data processing method according to claim 1, wherein the constructing comprises:
   determining a mesh corresponding to the two-dimensional mesh data as a first-level sub-mesh;
   acquiring vertex coordinates and center coordinates of $i^{th}$ target regions corresponding to $i^{th}$-level sub-meshes, $i=1, 2, \ldots, (N-1)$, N being a preset level number, and N being an integer greater than 1; and
   dividing, based on the vertex coordinates and the center coordinates of the $i^{th}$ target regions, the $i^{th}$-level sub-meshes to obtain a plurality of $(i+1)^{th}$-level sub-meshes.

4. The data processing method according to claim 1, wherein performing the grouping of triangles comprises:

determining, based on the vertex information and the triangle information, center coordinates of the triangles;

acquiring, based on region information of the at least one sub-mesh, vertex coordinates of a $j^{th}$ sub-mesh, j=1, 2, . . . , M, M being a total number of the at least one sub-mesh, and M being a positive integer; and allocating, based on the center coordinates of the triangles and the vertex coordinates of the $j^{th}$ sub-mesh, triangles with center coordinates positioned in the target region corresponding to the $j^{th}$ sub-mesh to the triangle grouping set corresponding to the $j^{th}$ sub-mesh.

5. The data processing method according to claim 4, wherein determining the center coordinates comprises:

determining, based on the vertex information and the triangle information, three vertex coordinates of each of the triangles, the vertex coordinates each comprising a first vertex coordinate value and a second vertex coordinate value;

determining, based on three first vertex coordinate values of each of the triangles, a first center coordinate value of each of the triangles; and determining, based on three second vertex coordinate values of each of the triangles, a second center coordinate value of each of the triangles.

6. The data processing method according to claim 1, wherein determining the cross-section loops comprises:

determining, based on the vertex information and the triangle information, a plurality of target edges in the triangle grouping sets, the target edges being edges existing in only one of the triangles in the triangle grouping sets;

determining target edges from the plurality of target edges in the triangle grouping sets that are connected end to end and form closed loops; and determining the formed closed loops as the cross-section loops of the at least one sub- mesh.

7. The data processing method according to claim 6, wherein determining the plurality of target edges comprises:

determining, based on the vertex information and the triangle information, connection edges in a $k^{th}$ triangle grouping set, k=1, 2, . . . , M, M being a total number of the at least one sub-mesh, and M being a positive integer;

determining, based on the triangle information, sharing numbers of the connection edges; and determining the connection edges of which the sharing numbers are a first preset value as the target edges in the kth triangle grouping set.

8. The data processing method according to claim 7, wherein determining the sharing numbers of the connection edges comprises:

setting the sharing numbers of the connection edges as the first preset value; and updating a sharing number of a first connection edge to a second preset value based on a second connection edge having same vertices of the first connection edge and an opposite direction to the first connection edge existing among other connection edges than the first connection edge; the first connection edge being any of the connection edges.

9. A data processing apparatus, the apparatus comprising: at least one memory configured to store program code; and at least one processor configured to read the program code and operate as instructed by the program code, the program code comprising:

dimension reduction code configured to cause at least one of the at least one processor to acquire three-dimensional mesh data to be processed, and perform dimension reduction on the three-dimensional mesh data to obtain two-dimensional mesh data, the two-dimensional mesh data comprising vertex information and triangle information;

hierarchical construction code configured to cause at least one of the at least one processor to construct, based on the two-dimensional mesh data, a hierarchical sub-mesh structure having one or more levels, each level of the hierarchical sub-mesh structure comprising at least one sub-mesh;

triangle grouping code configured to cause at least one of the at least one processor to perform, based on the at least one sub-mesh, grouping of triangles in the two-dimensional mesh data to obtain triangle grouping sets corresponding to the at least one sub-mesh;

hierarchical storage code configured to cause at least one of the at least one processor to hierarchically store, based on levels corresponding to the at least one sub-mesh, the at least one sub-mesh and the triangle grouping sets corresponding to the at least one sub-mesh;

first acquisition code configured to cause at least one of the at least one processor to acquire a first target level of the hierarchical sub-mesh structure to be rendered for a virtual object corresponding to the two-dimensional mesh data, the first target level being based on a required detail with which the virtual object is to be rendered in a scene;

first determination code configured to cause at least one of the at least one processor to determine, based on the vertex information, the first target level, and the triangle information, cross-section loops of one or more sub-meshes in the first target level;

first rendering code configured to cause at least one of the at least one processor to, based on the first target level, render one or more target sub-meshes and cross-sections of the one or more target sub-meshes to obtain a first rendering result rendering the virtual object corresponding to the two-dimensional mesh data corresponding to the required detail, wherein the cross-sections are based on the cross-section loops, and wherein the cross-sections of the one or more target sub-meshes are not visible when the virtual object is rendered corresponding to the first target level;

second determination code configured to cause at least one of the at least one processor to determine a second target level of the hierarchical sub-mesh structure for rendering the virtual object in response to the virtual object corresponding to the first target level being determined to meet a decomposition condition;

third determination code configured to cause at least one of the at least one processor to determine movement information and rotation information of the at least one sub-mesh in the second target level;

fourth determination code configured to cause at least one of the at least one processor to determine, based on the movement information and the rotation information of the sub-meshes, rendering positions of the at least one sub-mesh in the second target level; and rendering, based on the rendering positions and previously rendered cross-sections of the one or more target sub-meshes, a second rendering result.

10. The data processing apparatus according to claim 9, wherein the dimension reduction code is further configured to cause the at least one of the at least one processor to:

acquire a preset conformal mapping function;

acquire three-dimensional coordinate information of vertices from the three-dimensional mesh data; and perform conformal mapping on the three-dimensional coordinate information of the vertices using the preset conformal mapping function to obtain two-dimensional coordinate information of the vertices.

11. The data processing apparatus according to claim 9, wherein the hierarchical construction code is further configured to cause at least one of the at least one processor to:

determine a mesh corresponding to the two-dimensional mesh data as a first-level sub-mesh;

acquire vertex coordinates and center coordinates of $i^{th}$ target regions corresponding to $i^{th}$-level sub-meshes, $i=1, 2, \ldots, (N-1)$, N being a preset level number, and N being an integer greater than 1; and divide, based on the vertex coordinates and the center coordinates of the $i^{th}$ target regions, the $i^{th}$-level sub-meshes to obtain a plurality of $(i+1)^{th}$-level sub-meshes.

12. The data processing apparatus according to claim 9, wherein triangle grouping code is further configured to cause at least one of the at least one processor to:

determine, based on the vertex information and the triangle information, center coordinates of the triangles;

acquire, based on region information of the at least one sub-mesh, vertex coordinates of a $j^{th}$ sub-mesh, $j=1, 2, \ldots, M$, M being a total number of the at least one sub-mesh, and M being a positive integer; and allocate, based on the center coordinates of the triangles and the vertex coordinates of the $j^{th}$ sub-mesh, triangles with center coordinates positioned in the target region corresponding to the $j^{th}$ sub-mesh to the triangle grouping set corresponding to the $j^{th}$ sub-mesh.

13. The data processing apparatus according to claim 12, wherein the triangle grouping code is further configured to cause at least one of the at least one processor to:

determine, based on the vertex information and the triangle information, three vertex coordinates of each of the triangles, the vertex coordinates each comprising a first vertex coordinate value and a second vertex coordinate value;

determine, based on three first vertex coordinate values of each of the triangles, a first center coordinate value of each of the triangles; and determine, based on three second vertex coordinate values of each of the triangles, a second center coordinate value of each of the triangles.

14. The data processing apparatus according to claim 9, wherein the first determination code is further configured to cause at least one of the at least one processor to:

determine, based on the vertex information and the triangle information, a plurality of target edges in the triangle grouping sets, the target edges being edges existing in only one of the triangles in the triangle grouping sets;

determine target edges from the plurality of target edges in the triangle grouping sets that are connected end to end and form closed loops; and determine the formed closed loops as the cross-section loops of the at least one sub-mesh.

15. The data processing apparatus according to claim 14, wherein the first determination code is further configured to cause at least one of the at least one processor to:

determine, based on the vertex information and the triangle information, connection edges in a $k^{th}$ triangle grouping set, $k=1, 2, \ldots, M$, M being a total number of the at least one sub-mesh, and M being a positive integer;

determine, based on the triangle information, sharing numbers of the connection edges; and determine the connection edges of which the sharing numbers are a first preset value as the target edges in the $k^{th}$ triangle grouping set.

16. The data processing apparatus according to claim 15, wherein the first determination code is further configured to cause at least one of the at least one processor to:

set the sharing numbers of the connection edges as the first preset value; and update a sharing number of a first connection edge to a second preset value based on a second connection edge having same vertices of the first connection edge and an opposite direction to the first connection edge existing among other connection edges than the first connection edge; the first connection edge being any of the connection edges.

17. A non-transitory computer-readable storage medium storing computer code which, when executed by at least one processor, causes the at least one processor to at least:

acquire three-dimensional mesh data to be processed, and perform dimension reduction on the three-dimensional mesh data to obtain two-dimensional mesh data, the two-dimensional mesh data comprising vertex information and triangle information;

construct, based on the two-dimensional mesh data, a hierarchical sub-mesh structure having one or more levels, each level of the hierarchical sub-mesh structure comprising at least one sub-mesh;

perform, based on the at least one sub-mesh, grouping of triangles in the two-dimensional mesh data to obtain triangle grouping sets corresponding to the at least one sub-mesh;

hierarchically store, based on levels corresponding to the at least one sub-mesh, the at least one sub-mesh and the triangle grouping sets corresponding to the at least one sub-mesh;

determine, based on the vertex information and the triangle information, cross-section loops of each of the at least one sub-mesh, and render, based on the cross-section loops, cross-sections of each of the at least one sub-mesh;

acquire a first target level of the hierarchical sub-mesh structure to be rendered for a virtual object corresponding to the two-dimensional mesh data, the first target level being based on a required detail with which the virtual object is to be rendered in a scene;

determine, based on the vertex information, the first target level, and the triangle information, the cross-section loops of one or more sub-meshes in the first target level;

based on the first target level, render one or more target sub-meshes and cross sections of the one or more target sub-meshes to obtain a first rendering result rendering the virtual object corresponding to the two-dimensional mesh data corresponding to the required detail, wherein the cross-sections are based on the cross-section loops, and wherein the cross-sections of the one or more target sub-meshes are not visible when the virtual object is rendered corresponding to the first target level:

determine a second target level of the hierarchical sub-mesh structure for rendering the virtual object in response to the virtual object corresponding to the first target level being determined to meet a decomposition condition;

determine movement information and rotation information of the at least one sub-mesh in the second target level:

determine, based on the movement information and the rotation information of the sub-meshes, rendering positions of the at least one sub-mesh in the second target level; and rendering, based on the rendering positions and previously rendered cross-sections of the one or more target sub-meshes, a second rendering result.

\* \* \* \* \*